(12) United States Patent
Park et al.

(10) Patent No.: US 10,819,407 B2
(45) Date of Patent: Oct. 27, 2020

(54) UPLINK TRANSMISSION/RECEPTION METHOD IN WIRELESS COMMUNICATION SYSTEM AND DEVICE THEREFOR

(71) Applicant: LG Electronics Inc., Seoul (KR)

(72) Inventors: Jonghyun Park, Seoul (KR); Jiwon Kang, Seoul (KR); Kijun Kim, Seoul (KR); Haewook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/065,723

(22) PCT Filed: Sep. 26, 2017

(86) PCT No.: PCT/KR2017/010628
§ 371 (c)(1),
(2) Date: Jun. 22, 2018

(87) PCT Pub. No.: WO2018/056789
PCT Pub. Date: Mar. 29, 2018

(65) Prior Publication Data
US 2019/0222277 A1 Jul. 18, 2019

Related U.S. Application Data

(60) Provisional application No. 62/400,077, filed on Sep. 26, 2016, provisional application No. 62/401,961, (Continued)

(51) Int. Cl.
*H04B 7/0456* (2017.01)
*H04W 72/04* (2009.01)
(Continued)

(52) U.S. Cl.
CPC ......... *H04B 7/0486* (2013.01); *H04B 7/0456* (2013.01); *H04B 7/06* (2013.01);
(Continued)

(58) Field of Classification Search
CPC ...... H04B 7/04; H04B 7/0404; H04B 7/0408; H04B 7/0417; H04B 7/0421;
(Continued)

(56) References Cited

U.S. PATENT DOCUMENTS

2011/0002415 A1* 1/2011 Nakao ................. H04B 7/0439
375/296
2012/0275411 A1* 11/2012 Kim ...................... H04L 5/0032
370/329
(Continued)

FOREIGN PATENT DOCUMENTS

CN 102378271 A 3/2012
RU 2536345 12/2014
(Continued)

OTHER PUBLICATIONS

Sequans Communications, "Presence of SRS bit in DCI 6-0A/6-1A," 3GPP TSG RAN WG1 Meeting #86, R1-166622, Aug. 22-26, 2016, 4 pages.
(Continued)

*Primary Examiner* — Young T Tse
(74) *Attorney, Agent, or Firm* — Fish & Richardson P.C.

(57) ABSTRACT

Disclosed is a method for uplink transmission and reception in a wireless communication system and an apparatus therefor. Specifically, a method for performing uplink transmission by a user equipment (UE) in a wireless communication system may comprise the steps of: receiving downlink control information (DCI) including sounding reference signal (SRS) resource indication (SRI) and precoding indication from a base station; and transmitting an uplink to the base station by applying precoding indicated by the precoding indication on an antenna port of an SRS transmitted within an SRS resource selected by the SRI.

20 Claims, 11 Drawing Sheets

Related U.S. Application Data filed on Sep. 30, 2016, provisional application No. 62/416,682, filed on Nov. 2, 2016.

(51) Int. Cl.
| | |
|---|---|
| *H04B 7/06* | (2006.01) |
| *H04L 25/02* | (2006.01) |
| *H04L 27/26* | (2006.01) |
| *H04L 5/00* | (2006.01) |
| *H04W 72/06* | (2009.01) |

(52) U.S. Cl.
CPC ......... *H04B 7/0617* (2013.01); *H04B 7/0626* (2013.01); *H04B 7/0639* (2013.01); *H04L 5/0048* (2013.01); *H04L 5/0051* (2013.01); *H04L 25/0226* (2013.01); *H04L 27/2607* (2013.01); *H04W 72/042* (2013.01); *H04W 72/06* (2013.01); *H04L 5/0007* (2013.01)

(58) Field of Classification Search
CPC .. H04B 7/0456; H04B 7/0469; H04B 7/0473; H04B 7/0478; H04B 7/0486; H04B 7/0617; H04B 7/0619; H04B 7/0626; H04B 7/0628; H04B 7/063; H04B 7/0632; H04B 7/0634; H04B 7/0639; H04B 7/06; H04L 5/0048; H04L 5/0051; H04L 25/0226; H04L 27/2607; H04W 72/02; H04W 72/04; H04W 72/0413; H04W 72/042
USPC ....... 375/146, 147, 259, 260, 262, 265, 267; 370/208–210
See application file for complete search history.

(56) References Cited

U.S. PATENT DOCUMENTS

| | | | |
|---|---|---|---|
| 2014/0204856 A1 | 7/2014 | Chen | |
| 2014/0219199 A1* | 8/2014 | Ji | H04L 5/0048 370/329 |
| 2014/0219373 A1 | 8/2014 | Mobasher et al. | |
| 2015/0365936 A1 | 12/2015 | Nishio | |
| 2017/0047975 A1* | 2/2017 | Lee | H04B 7/0486 |
| 2017/0214442 A1* | 7/2017 | Chae | H04B 7/0456 |
| 2017/0302419 A1* | 10/2017 | Liu | H04W 48/12 |
| 2018/0097595 A1* | 4/2018 | Huang | H04B 7/0413 |

FOREIGN PATENT DOCUMENTS

| | | |
|---|---|---|
| WO | WO2016114696 | 7/2016 |
| WO | WO2018056789 A | 3/2018 |

OTHER PUBLICATIONS

Written Opinion of the International Searching Authority in International Application No. PCT/KR2017/010628, dated Jan. 17, 2018, 10 pages.

Samsung, Intel, NTT DOCOMO, Huawei, "WF on Frequency Selective Precoding for NR UL MIMO," R1-168173, 3GPP TSG RAN WGI Meeting #86, Gothenburg, Sweden, Aug. 22-26, 2016, 3 pages, XP-051144275.

Extended European Search Report in European Application No. 17853503.5, dated Sep. 11, 2019, 10 pages.

Russian Office Action in Russian Application No. 2019112447, dated Sep. 19, 2019, 12 pages (with English translation).

India Office Action in India Appln. No. 201927007126, dated Sep. 2, 2020, 6 pages.

* cited by examiner

UPLINK TRANSMISSION/RECEPTION METHOD IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2017/010628, filed on Sep. 26, 2017, which claims the benefit of U.S. Provisional Application No. 62/400,077, filed on Sep. 26, 2016, No. 62/401,961, filed on Sep. 30, 2016, No. 62/416,682, filed on Nov. 2, 2016, the contents of which are all hereby incorporated by reference herein in their entirety.

TECHNICAL FIELD

The present invention relates to a wireless communication system, and more particularly, to method for an uplink multi input multi output (MIMO) transmission and an apparatus for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to propose a method for uplink multi input multi output (MIMO) transmission.

Further, an object of the present invention is to propose a method for configuring downlink control information (DCI) for multi input multi output (MIMO) transmission.

Further, an object of the present invention is to propose a method for transmitting an uplink reference signal which becomes a base for uplink multi input multi output (MIMO) transmission and a method for controlling the same.

Technical objects to be achieved by the present invention are not limited to the aforementioned technical objects, and other technical objects not described above may be evidently understood by a person having ordinary skill in the art to which the present invention pertains from the following description.

Technical Solution

In an aspect of the present invention, a method for performing uplink transmission by a user equipment (UE) in a wireless communication system may include: receiving downlink control information (DCI) including sounding reference signal (SRS) resource indication (SRI) and precoding indication from a base station; and transmitting an uplink to the base station by applying precoding indicated by the precoding indication on an antenna port of an SRS transmitted in an SRS resource selected by the SRI.

In another aspect of the present invention, a user equipment (UE) performing uplink transmission in a wireless communication system may include: a radio frequency (RF) unit for transmitting and receiving a radio signal; and a processor controlling the RF unit, and the processor may be configured to receive downlink control information (DCI) including sounding reference signal (SRS) resource indication (SRI) and precoding indication from a base station, and transmit an uplink to the base station by applying precoding indicated by the precoding indication on an antenna port of an SRS transmitted in an SRS resource selected by the SRI.

Preferably, the method may further include transmitting a precoded SRS for each of one or more SRS resources configured for the UE to the base station.

Preferably, a beamforming vector and/or beamforming coefficient applied for transmission of the precoded SRS may be configured through control channel signaling by the base station or arbitrarily determined by the UE.

Preferably, the beamforming vector and/or beamforming coefficient applied for the precoded SRS transmission in the SRS resource may be determined based on a beamforming vector and/or beamforming coefficient used for reception of a downlink reference signal (DL RS).

Preferably, the DL RS may be a channel state information reference signal (CSI-RS), and a CSI-RS resource used for determining the beamforming vector and/or beamforming coefficient applied for the precoded SRS transmission may be indicated by the base station.

Preferably, an independent beamforming vector and/or beamforming coefficient may be applied for each subband for the precoded SRS transmission in the SRS resource.

Preferably, the beamforming vector and/or beamforming coefficient applied for the precoded SRS transmission for each subband may be determined based on a beamforming vector and/or beamforming coefficient used for reception of a downlink reference signal (DL RS).

Preferably, the DL RS may be a channel state information reference signal (CSI-RS), and a CSI-RS resource used for determining the beamforming vector and/or beamforming coefficient applied for the precoded SRS transmission may be indicated by the base station.

Preferably, the DCI may further include a rank indication for the uplink transmission.

Preferably, the number of ranks for the uplink transmission may be determined as the number of antenna ports of the SRS transmitted in the SRS resource selected by the SRI.

Preferably, the precoding indication may be divided into first precoding indication and second precoding indication, and the second precoding indication may be jointly encoded with uplink resource allocation information scheduled to the UE.

Advantageous Effects

According to the embodiment of the present invention, frequency selective optimized precoding may be supported even in the uplink.

Further, according to the embodiment of the present invention, uplink transmission throughput may be enhanced by applying optimized precoding for each uplink subband (resource block group).

Further, according to the embodiment of the present invention, overhead of downlink control information related to the uplink for applying uplink subband (resource block group) precoding may be minimized.

Effects which may be obtained by the present invention are not limited to the aforementioned effects, and other technical effects not described above may be evidently understood by a person having ordinary skill in the art to which the present invention pertains from the following description.

DESCRIPTION OF DRAWINGS

The accompanying drawings, which are included herein as a part of the description for help understanding the present invention, provide embodiments of the present invention, and describe the technical features of the present invention with the description below.

MODE FOR INVENTION

Figure 1:
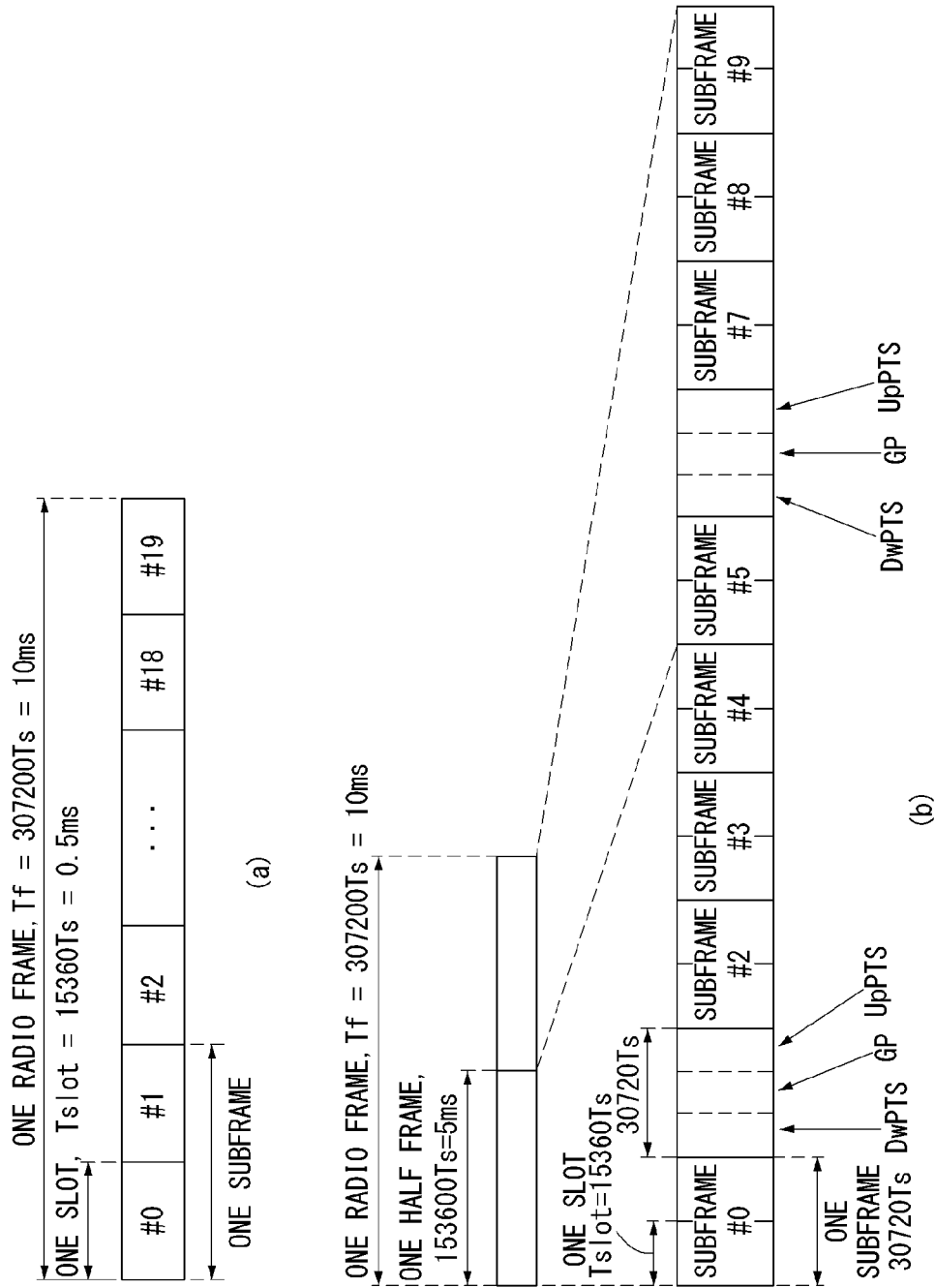
FIG. 1 illustrates the structure of a radio frame in a wireless communication system to which the present invention may be applied.

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A or new RAT (RAT in 5G (5 generation) system) is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot $2i$ and slot $2i+1$. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot $2i$ and slot $2i+1$ of $T\_slot=15360*T\_s=0.5$ ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| Special subframe configuration | Normal cyclic prefix in downlink | | | Extended cyclic prefix in dowlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

Figure 2:
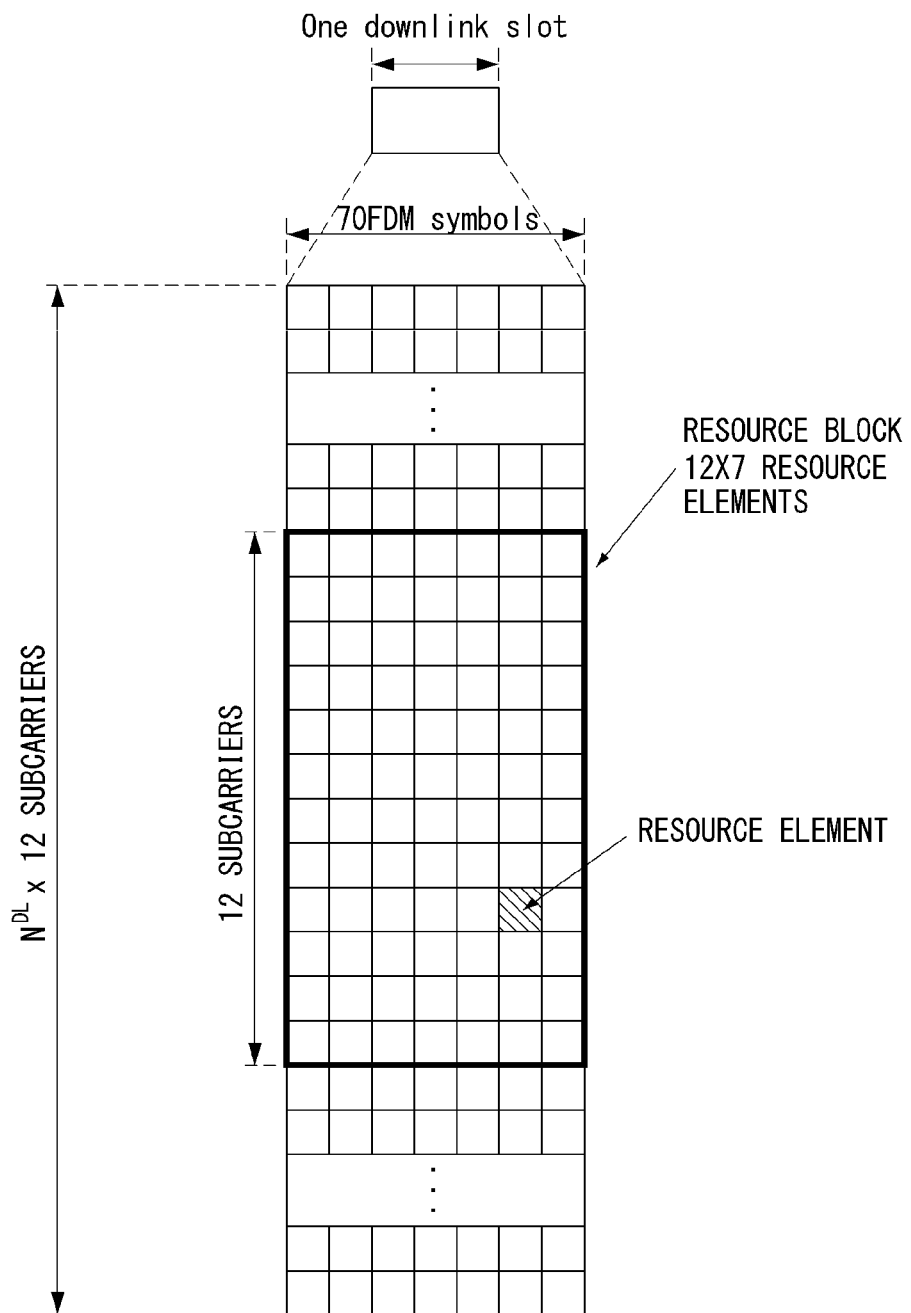
FIG. 2 is a diagram illustrating a resource grid for a downlink slot in a wireless communication system to which the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

Figure 3:
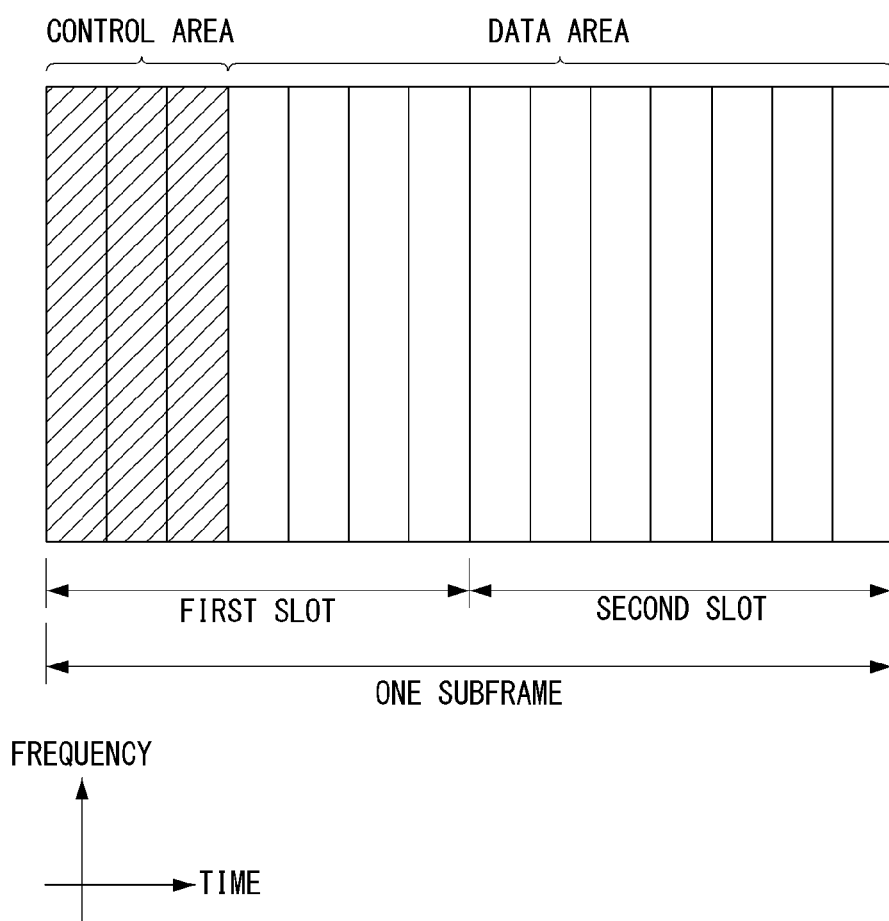
FIG. 3 illustrates a structure of downlink subframe in a wireless communication system to which the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

Figure 4:
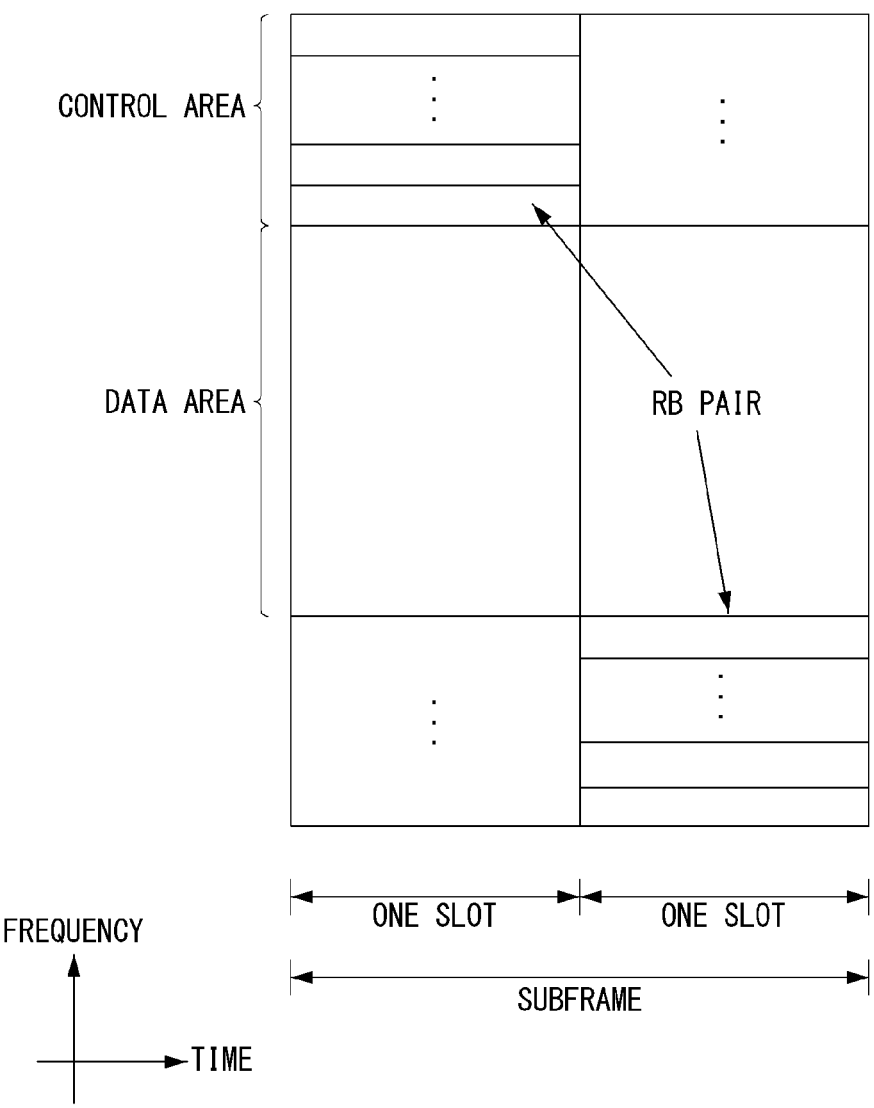
FIG. 4 illustrates a structure of uplink subframe in a wireless communication system to which the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

Figure 5:
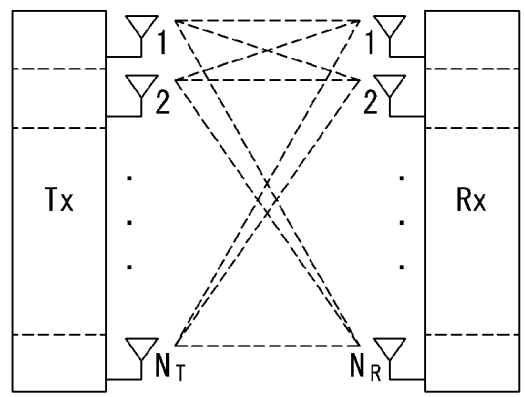
FIG. 5 shows the configuration of a known MIMO communication system.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R)$$ [Equation 1]

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$S = [s_1, s_2, \Lambda, s_{N_T}]^T$$ [Equation 2]

Meanwhile, transmission power may be different in each of pieces of transmission information s_1, s_2, . . . , s_NT. In this case, if pieces of transmission power are P_1, P_2, . . . , P_NT, transmission information having controlled transmission power may be represented using the following vector.

$$\hat{s} = [\hat{s}_1, \hat{s}_2, \Lambda, \hat{s}_{N_T}]^T = [P_1 s_1, P_2 s_2, \Lambda, P_{N_T} s_{N_T}]^T$$ [Equation 3]

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & O & \\ 0 & & & P_{N_T} \end{bmatrix} \begin{bmatrix} s_1 \\ s_2 \\ M \\ s_{N_T} \end{bmatrix} = Ps$$ [Equation 4]

Meanwhile, the information vector having controlled transmission power in the Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

$$x = \begin{bmatrix} x_1 \\ x_2 \\ M \\ x_i \\ M \\ x_{N_T} \end{bmatrix} = \begin{bmatrix} w_{11} & w_{12} & \Lambda & w_{1N_T} \\ w_{21} & w_{22} & \Lambda & w_{2N_T} \\ M & & O & \\ w_{i1} & w_{i2} & \Lambda & w_{iN_T} \\ M & & O & \\ w_{N_T 1} & w_{N_T 2} & \Lambda & w_{N_T N_T} \end{bmatrix} \begin{bmatrix} \hat{s}_1 \\ \hat{s}_2 \\ M \\ \hat{s}_j \\ M \\ \hat{s}_{N_T} \end{bmatrix} = W\hat{s} = WPs$$ [Equation 5]

In this case, w_ij denotes weight between an i-th transmission antenna and a j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, . . . , y_NR of the respective antennas are represented as follows using a vector Y.

$$y=[y_1,y_2,\Lambda,y_{N_R}]^T$$ [Equation 6]

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

Figure 6:
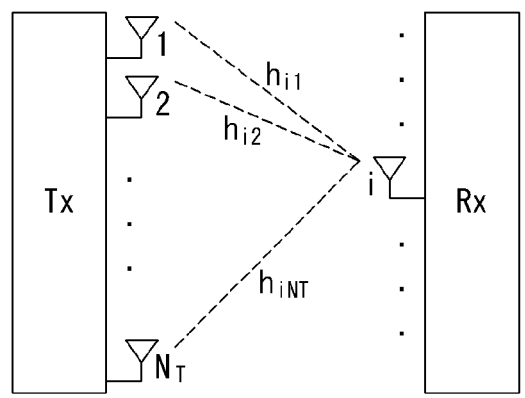
FIG. 6 is a diagram showing a channel from a plurality of transmission antennas to a single reception antenna.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T=[h_{i1},h_{i2},\Lambda,h_{iN_T}]$$ [Equation 7]

Furthermore, if all channels from the N_T transmission antenna to NR reception antennas are represented through a matrix expression, such as Equation 7, they may be represented as follows.

$$H = \begin{bmatrix} h_1^T \\ h_2^T \\ M \\ h_i^T \\ M \\ h_{N_R}^T \end{bmatrix} = \begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R 1} & h_{N_R 2} & \Lambda & h_{N_R N_T} \end{bmatrix}$$ [Equation 8]

Meanwhile, Additive White Gaussian Noise (AWGN) is added to an actual channel after the actual channel experiences the channel matrix H. Accordingly, AWGN n_1, n_2, . . . , n_NR added to the N_R reception antennas, respectively, are represented using a vector as follows.

$$n=[n_1,n_2,\Lambda,n_{N_R}]^T$$ [Equation 9]

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ M \\ y_i \\ M \\ y_{N_R} \end{bmatrix} = \begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R 1} & h_{N_R 2} & \Lambda & h_{N_R N_T} \end{bmatrix} \begin{bmatrix} x_1 \\ x_2 \\ M \\ x_j \\ M \\ x_{N_T} \end{bmatrix} + \begin{bmatrix} n_1 \\ n_2 \\ M \\ n_i \\ M \\ n_{N_R} \end{bmatrix} =$$ [Equation 10]

$$Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \le \min(N_T, N_R)$$ [Equation 11]

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

Figure 7:
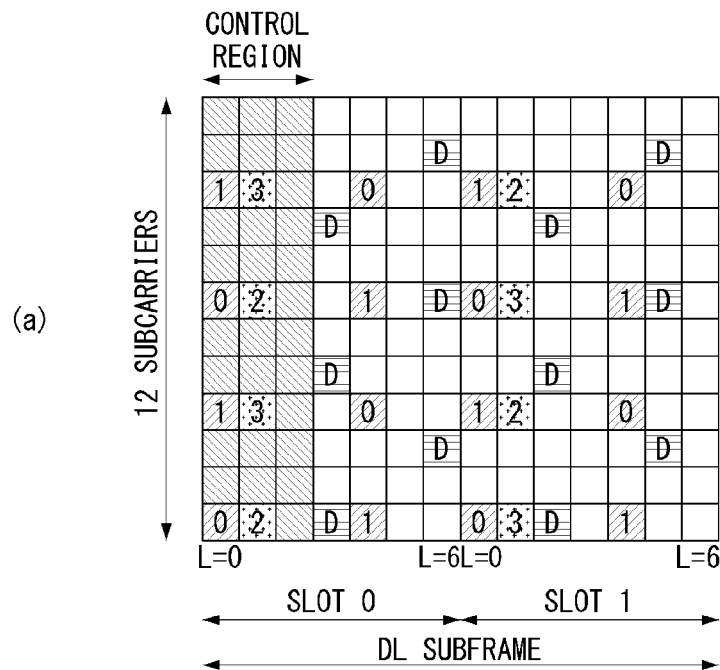
FIG. 7 illustrates reference signal patterns mapped to downlink resource block pairs in a wireless communication system to which the present invention may be applied.
Figure 7:
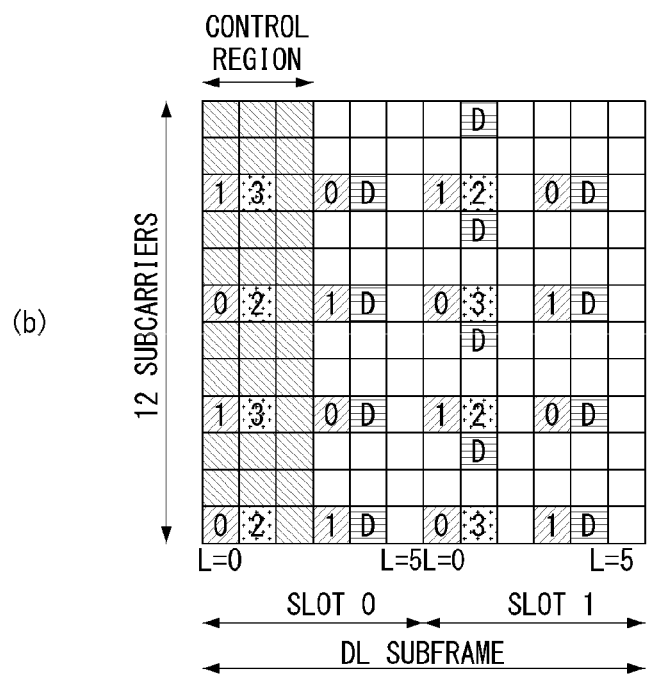

FIG. 7 illustrates reference signal patterns mapped to downlink resource block pairs in a wireless communication system to which the present invention may be applied.

Referring to FIG. 7, a downlink resource block pair, that is, a unit in which a reference signal is mapped, may be represented in the form of one subframe in a time domain X 12 subcarriers in a frequency domain. That is, in a time axis (an x axis), one resource block pair has a length of 14 OFDM symbols in the case of a normal cyclic prefix (CP) (FIG. 7a) and has a length of 12 OFDM symbols in the case of an extended cyclic prefix (CP) (FIG. 7b). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

A CRS is described in more detail below. The CRS is a reference signal which is used to estimate the channel of a physical antenna and may be received by all UEs located within a cell in common. The CRS is distributed to a full frequency bandwidth. That is, the CRS is cell-specific signal and is transmitted every subframe in a wideband. Furthermore, the CRS may be used for channel quality information (CQI) and data demodulation.

A CRS is defined in various formats depending on an antenna array on the transmitting side (eNB). In the 3GPP LTE system (e.g., Release-8), an RS for a maximum four antenna ports is transmitted depending on the number of transmission antennas of an eNB. The side from which a downlink signal is transmitted has three types of antenna arrays, such as a single transmission antenna, two transmission antennas and four transmission antennas. For example, if the number of transmission antennas of an eNB is two, CRSs for a No. 0 antenna port and a No. 1 antenna port are transmitted. If the number of transmission antennas of an eNB is four, CRSs for No. 0~No. 3 antenna ports are transmitted. If the number of transmission antennas of an eNB is four, a CRS pattern in one RB is shown in FIG. 7.

If an eNB uses a single transmission antenna, reference signals for a single antenna port are arrayed.

If an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, if an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

If a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

A DRS is described in more detail below. The DRS is used to demodulate data. In multi-input multi-output antenna transmission, precoding weight used for a specific UE is combined with a transmission channel transmitted by each transmission antenna when the UE receives an RS, and is used to estimate a corresponding channel without any change.

A 3GPP LTE system (e.g., Release-8) supports a maximum of four transmission antennas, and a DRS for rank 1 beamforming is defined. The DRS for rank 1 beamforming also indicates an RS for an antenna port index 5.

In an LTE-A system, that is, an advanced and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, if an eNB has four to a maximum of eight downlink transmission antennas in the LTE-A system, RSs for these antenna ports must be additionally defined and designed. Regarding the RSs for the maximum of eight transmission antenna ports, the aforementioned RS for channel measurement and the aforementioned RS for data demodulation must be designed.

One of important factors that must be considered in designing an LTE-A system is backward compatibility, that is, that an LTE UE must well operate even in the LTE-A system, which must be supported by the system. From an RS transmission viewpoint, in the time-frequency domain in which a CRS defined in LTE is transmitted in a full band every subframe, RSs for a maximum of eight transmission antenna ports must be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement object for the selection of MCS or a PMI (channel state information-RS or channel state indication-RS (CSI-RS)) and an RS for the demodulation of data transmitted through eight transmission antennas (data demodulation-RS (DM-RS)).

The CSI-RS for the channel measurement object is characterized in that it is designed for an object focused on channel measurement unlike the existing CRS used for objects for measurement, such as channel measurement and handover, and for data demodulation. Furthermore, the CSI-RS may also be used for an object for measurement, such as handover. The CSI-RS does not need to be transmitted every subframe unlike the CRS because it is transmitted for an object of obtaining information about a channel state. In order to reduce overhead of a CSI-RS, the CSI-RS is intermittently transmitted on the time axis.

For data demodulation, a DM-RS is dedicatedly transmitted to a UE scheduled in a corresponding time-frequency domain. That is, a DM-RS for a specific UE is transmitted only in a region in which the corresponding UE has been scheduled, that is, in the time-frequency domain in which data is received.

In the LTE-A system, a maximum of eight transmission antennas are supported in the downlink of an eNB. In the LTE-A system, if RSs for a maximum of eight transmission antennas are transmitted in a full band every subframe using the same method as the CRS in the existing LTE, RS overhead is excessively increased. Accordingly, in the LTE-A system, an RS has been separated into the CSI-RS of the CSI measurement object for the selection of MCS or a PMI and the DM-RS for data demodulation, and thus the two RSs have been added. The CSI-RS may also be used for an object, such as RRM measurement, but has been designed for a main object for the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

For data demodulation, a DM-RS is dedicatedly transmitted to a UE scheduled in a corresponding time-frequency domain. That is, a DM-RS for a specific UE is transmitted only in the region in which scheduling is performed for the corresponding UE, that is, only in the time-frequency domain in which data is received.

In order to measure a CSI-RS, a UE must be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB must notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, ..., 18, and p=15, ..., 22, respectively. A CSI-RS may be defined for only a subcarrier interval Δf=15 kHz.

In a subframe configured for CSI-RS transmission, a CSI-RS sequence is mapped to a complex-valued modulation symbol a_k,l^(p) used as a reference symbol on each antenna port p as in Equation 12.

$$a_{k,l}^{(p)} = w_{l''} \cdot r_{l,n_s}(m') \qquad \text{[Equation 12]}$$

$$k = k' +$$

$$12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations } 0-19, \\ & \text{normal cyclic prefix} \\ 2l'' & \text{CSI reference signal configurations } 20-31, \\ & \text{normal cyclic prefix} \\ l'' & \text{CSI reference signal configurations } 0-27, \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 12, (k',l') (wherein k' is a subcarrier index within a resource block and l' indicates an OFDM symbol index within a slot.) and the condition of n_s is determined depending on a CSI-RS configuration, such as Table 3 or Table 4.

Table 3 illustrates the mapping of (k',l') from a CSI-RS configuration in a normal CP.

TABLE 3

| | CSI reference signal configuration | Number of CSI reference signals configured | | | | | |
|---|---|---|---|---|---|---|---|
| | | 1 or 2 | | 4 | | 8 | |
| | | (k', l') | n_s mod 2 | (k', l') | n_s mod 2 | (k', l') | n_s mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 4 illustrates the mapping of (k',l') from a CSI-RS configuration in an extended CP.

TABLE 4

| | CSI reference signal configuration | Number of CSI reference signals configured | | | | | |
|---|---|---|---|---|---|---|---|
| | | 1 or 2 | | 4 | | 8 | |
| | | (k', l') | n_s mod 2 | (k', l') | n_s mod 2 | (k', l') | n_s mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |

TABLE 4-continued

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Referring to Table 3 and Table 4, in the transmission of a CSI-RS, in order to reduce inter-cell interference (ICI) in a multi-cell environment including a heterogeneous network (HetNet) environment, a maximum of 32 different configurations (in the case of a normal CP) or a maximum of 28 different configurations (in the case of an extended CP) are defined.

The CSI-RS configuration is different depending on the number of antenna ports and a CP within a cell, and a neighboring cell may have a maximum of different configurations. Furthermore, the CSI-RS configuration may be divided into a case where it is applied to both an FDD frame and a TDD frame and a case where it is applied to only a TDD frame depending on a frame structure.

(k',l') and n_s are determined depending on a CSI-RS configuration based on Table 3 and Table 4, and time-frequency resources used for CSI-RS transmission are determined depending on each CSI-RS antenna port.

Figure 8:
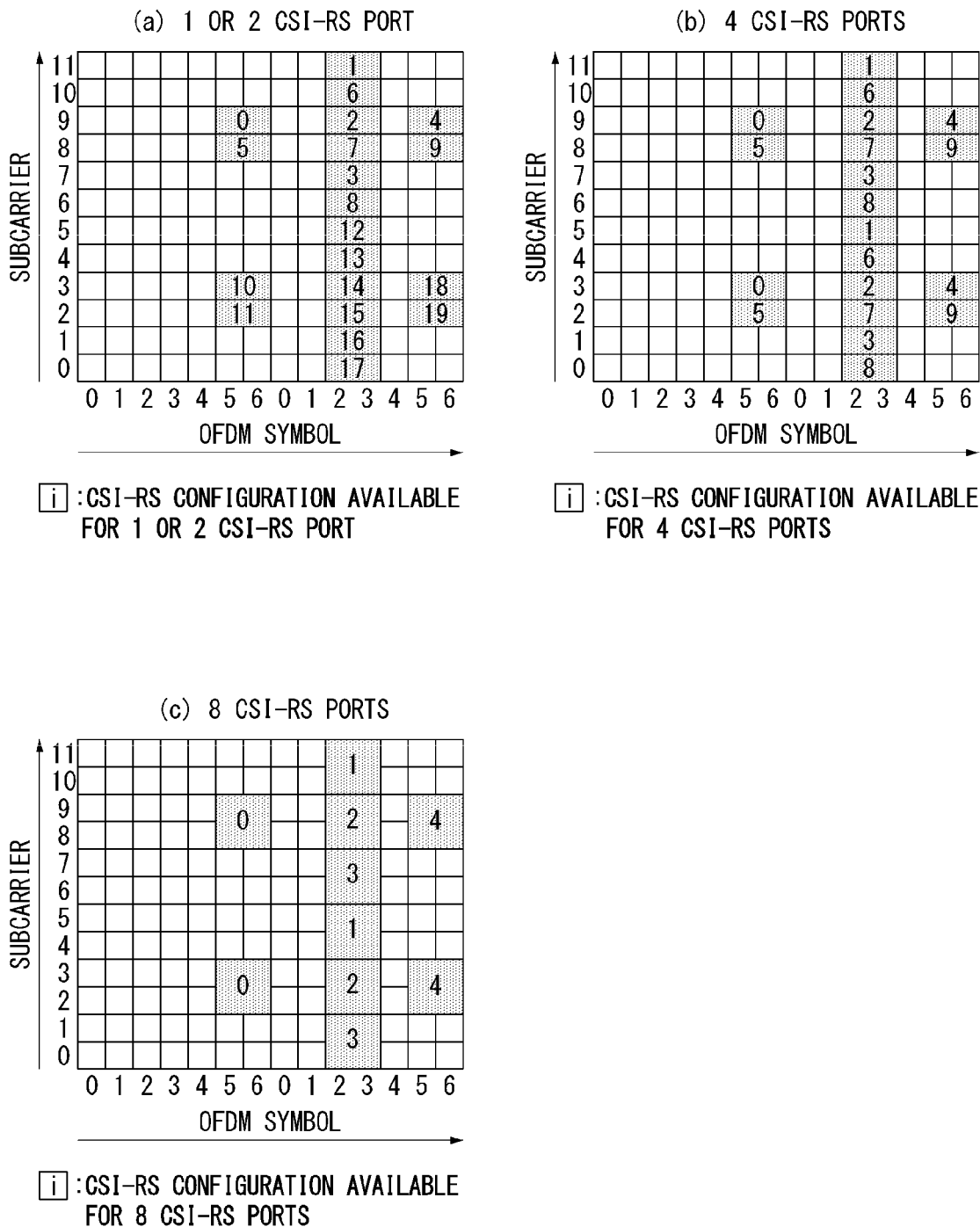
FIG. 8 is a diagram illustrating resources to which reference signals are mapped in a wireless communication system to which the present invention may be applied.

FIG. 8 is a diagram illustrating resources to which reference signals are mapped in a wireless communication system to which the present invention may be applied.

FIG. 8(a) shows twenty types of CSI-RS configurations available for CSI-RS transmission by one or two CSI-RS antenna ports, FIG. 8(b) shows ten types of CSI-RS configurations available for four CSI-RS antenna ports, and FIG. 8(c) shows five types of CSI-RS configurations available for eight CSI-RS antenna ports.

As described above, radio resources (i.e., an RE pair) in which a CSI-RS is transmitted are determined depending on each CSI-RS configuration.

If one or two antenna ports are configured for CSI-RS transmission with respect to a specific cell, the CSI-RS is transmitted on radio resources on a configured CSI-RS configuration of the twenty types of CSI-RS configurations shown in FIG. 8(a).

Likewise, when four antenna ports are configured for CSI-RS transmission with respect to a specific cell, a CSI-RS is transmitted on radio resources on a configured CSI-RS configuration of the ten types of CSI-RS configurations shown in FIG. 8(b). Furthermore, when eight antenna ports are configured for CSI-RS transmission with respect to a specific cell, a CSI-RS is transmitted on radio resources on a configured CSI-RS configuration of the five types of CSI-RS configurations shown in FIG. 8(c).

A CSI-RS for each antenna port is subjected to CDM for every two antenna ports (i.e., {15,16}, {17,18}, {19,20} and {21,22}) on the same radio resources and transmitted. For example, in the case of antenna ports 15 and 16, CSI-RS complex symbols for the respective antenna ports 15 and 16 are the same, but are multiplied by different types of orthogonal code (e.g., Walsh code) and mapped to the same radio resources. The complex symbol of the CSI-RS for the antenna port 15 is multiplied by [1, 1], and the complex symbol of the CSI-RS for the antenna port 16 is multiplied by [1 −1] and mapped to the same radio resources. The same is true of the antenna ports {17,18}, {19,20} and {21,22}.

A UE may detect a CSI-RS for a specific antenna port by multiplying code by which a transmitted symbol has been multiplied. That is, a transmitted symbol is multiplied by the code [1 1] multiplied in order to detect the CSI-RS for the antenna port 15, and a transmitted symbol is multiplied by the code [1-1] multiplied in order to detect the CSI-RS for the antenna port 16.

Referring to FIGS. 8(a) to 8(c), in the case of the same CSI-RS configuration index, radio resources according to a CSI-RS configuration having a large number of antenna ports include radio resources having a small number of CSI-RS antenna ports. For example, in the case of a CSI-RS configuration 0, radio resources for the number of eight antenna ports include both radio resources for the number of four antenna ports and radio resources for the number of one or two antenna ports.

A plurality of CSI-RS configurations may be used in one cell. 0 or one CSI-RS configuration may be used for a non-zero power (NZP) CSI-RS, and 0 or several CSI-RS configurations may be used for a zero power (ZP) CSI-RS.

For each bit set to 1 in a zeropower (ZP) CSI-RS ('ZeroPowerCSI-RS') that is a bitmap of 16 bits configured by a high layer, a UE assumes zero transmission power in REs (except a case where an RE overlaps an RE assuming a NZP CSI-RS configured by a high layer) corresponding to the four CSI-RS columns of Table 3 and Table 4. The most significant bit (MSB) corresponds to the lowest CSI-RS configuration index, and next bits in the bitmap sequentially correspond to next CSI-RS configuration indices.

A CSI-RS is transmitted only in a downlink slot that satisfies the condition of (n_s mod 2) in Table 3 and Table 4 and a subframe that satisfies the CSI-RS subframe configurations.

In the case of the frame structure type 2 (TDD), a CSI-RS is not transmitted in a special subframe, a synchronization signal (SS), a subframe colliding against a PBCH or SystemInformationBlockType1 (SIB 1) Message transmission or a subframe configured to paging message transmission.

Furthermore, an RE in which a CSI-RS for any antenna port belonging to an antenna port set S (S={15}, S={15,16}, S={17,18}, S={19,20} or S={21,22}) is transmitted is not used for the transmission of a PDSCH or for the CSI-RS transmission of another antenna port.

Time-frequency resources used for CSI-RS transmission cannot be used for data transmission. Accordingly, data throughput is reduced as CSI-RS overhead is increased. By considering this, a CSI-RS is not configured to be transmitted every subframe, but is configured to be transmitted in each transmission period corresponding to a plurality of subframes. In this case, CSI-RS transmission overhead can be significantly reduced compared to a case where a CSI-RS is transmitted every subframe.

A subframe period (hereinafter referred to as a "CSI transmission period") T_CSI-RS and a subframe offset Δ_CSI-RS for CSI-RS transmission are shown in Table 5.

Table 5 illustrates CSI-RS subframe configurations.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Referring to Table 5, the CSI-RS transmission period T_CSI-RS and the subframe offset Δ_CSI-RS are determined depending on the CSI-RS subframe configuration I_CSI-RS.

The CSI-RS subframe configuration of Table 5 may be configured as one of the aforementioned 'SubframeConfig' field and 'zeroTxPowerSubframeConfig' field. The CSI-RS subframe configuration may be separately configured with respect to an NZP CSI-RS and a ZP CSI-RS.

A subframe including a CSI-RS satisfies Equation 13.

$$(10n_f + \lfloor n_s/2 \rfloor - \Delta_{CSI-RS}) \bmod T_{CSI-RS} = 0 \quad \text{[Equation 13]}$$

In Equation 13, T_CSI-RS means a CSI-RS transmission period, Δ_CSI-RS means a subframe offset value, n_f means a system frame number, and n_s means a slot number.

In the case of a UE in which the transmission mode 9 has been configured with respect to a serving cell, one CSI-RS resource configuration may be configured for the UE. In the case of a UE in which the transmission mode 10 has been configured with respect to a serving cell, one or more CSI-RS resource configuration (s) may be configured for the UE.

In the current LTE standard, a CSI-RS configuration includes an antenna port number (antennaPortsCount), a subframe configuration (subframeConfig), and a resource configuration (resourceConfig). Accordingly, the a CSI-RS configuration provides notification that a CSI-RS is transmitted how many antenna port, provides notification of the period and offset of a subframe in which a CSI-RS will be transmitted, and provides notification that a CSI-RS is transmitted in which RE location (i.e., a frequency and OFDM symbol index) in a corresponding subframe.

Specifically, the following parameters for each CSI-RS (resource) configuration are configured through high layer signaling.

If the transmission mode 10 has been configured, a CSI-RS resource configuration identifier A CSI-RS port number (antennaPortsCount): a parameter (e.g., one CSI-RS port, two CSI-RS ports, four CSI-RS ports or eight CSI-RS ports) indicative of the number of antenna ports used for CSI-RS transmission A CSI-RS configuration (resourceConfig) (refer to Table 3 and Table 4): a parameter regarding a CSI-RS allocation resource location A CSI-RS subframe configuration (subframeConfig, that is, I_CSI-RS) (refer to Table 5): a parameter regarding the period and/or offset of a subframe in which a CSI-RS will be transmitted If the transmission mode 9 has been configured, transmission power P_C for CSI feedback: in relation to the assumption of a UE for reference PDSCH transmission power for feedback, when the UE derives CSI feedback and takes a value within a [−8, 15] dB range in a 1-dB step size, P_C is assumed to be the ratio of energy per resource element (EPRE) per PDSCH RE and a CSI-RS EPRE.

If the transmission mode 10 has been configured, transmission power P_C for CSI feedback with respect to each CSI process. If CSI subframe sets C_CSI,0 and C_CSI,1 are configured by a high layer with respect to a CSI process, P_C is configured for each CSI subframe set in the CSI process.

A pseudo-random sequence generator parameter n_ID

If the transmission mode 10 has been configured, a high layer parameter 'qcl-CRS-Info-r11' including a QCL scrambling identifier for a quasico-located (QCL) type B UE assumption (qcl-ScramblingIdentity-r11), a CRS port count (crs-PortsCount-r11), and an MBSFN subframe configuration list (mbsfn-SubframeConfigList-r11) parameter.

When a CSI feedback value derived by a UE has a value within the [−8, 15] dB range, P_C is assumed to be the ration of PDSCH EPRE to CSI-RS EPRE. In this case, the PDSCH EPRE corresponds to a symbol in which the ratio of PDSCH EPRE to CRS EPRE is ρ_A.

A CSI-RS and a PMCH are not configured in the same subframe of a serving cell at the same time.

In the frame structure type 2, if four CRS antenna ports have been configured, a CSI-RS configuration index belonging to the [20-31] set (refer to Table 3) in the case of a normal CP or a CSI-RS configuration index belonging to the [16-27] set (refer to Table 4) in the case of an extended CP is not configured in a UE.

A UE may assume that the CSI-RS antenna port of a CSI-RS resource configuration has a QCL relation with delay spread, Doppler spread, Doppler shift, an average gain and average delay.

A UE in which the transmission mode 10 and the QCL type B have been configured may assume that antenna ports 0-3 corresponding to a CSI-RS resource configuration and antenna ports 15-22 corresponding to a CSI-RS resource configuration have QCL relation with Doppler spread and Doppler shift.

In the case of a UE in which the transmission modes 1-9 have been configured, one ZP CSI-RS resource configuration may be configured in the UE with respect to a serving cell. In the case of a UE in which the transmission mode 10 has been configured, one or more ZP CSI-RS resource configurations may be configured in the UE with respect to a serving cell.

The following parameters for a ZP CSI-RS resource configuration may be configured through high layer signaling.

The ZP CSI-RS configuration list (zeroTxPowerResourceConfigList) (refer to Table 3 and Table 4): a parameter regarding a zero-power CSI-RS configuration The ZP CSI-RS subframe configuration (eroTxPowerSubframeConfig, that is, I_CSI-RS) (refer to Table 5): a parameter regarding the period and/or offset of a subframe in which a zero-power CSI-RS is transmitted A ZP CSI-RS and a PMCH are not configured in the same subframe of a serving cell at the same time.

In the case of a UE in which the transmission mode 10 has been configured, one or more channel state information—interference measurement (CSI-IM) resource configurations may be configured in the UE with respect to a serving cell.

The following parameters for each CSI-IM resource configuration may be configured through high layer signaling.

The ZP CSI-RS configuration (refer to Table 3 and Table 4)

The ZP CSI RS subframe configuration I_CSI-RS (refer to Table 5)

A CSI-IM resource configuration is the same as any one of configured ZP CSI-RS resource configurations.

A CSI-IM resource and a PMCH are not configured within the same subframe of a serving cell at the same time.

Sounding Reference Signal (SRS)

An SRS is mainly used for channel quality measurement to perform uplink frequency-selective scheduling and is not related to transmission of uplink data and/or control information. However, the present invention is not limited thereto and the SRS may be used for various other purposes to enhance power control or to support various start-up functions of recently unscheduled terminals. As an example of the start-up function, an initial modulation and coding scheme (MCS), initial power control for data transmission, timing advance, and frequency semi-selective scheduling may be included. In this case, frequency semi-selective scheduling refers to scheduling that selectively allocates frequency resources to a first slot of a subframe and allocating the frequency resources by pseudo-randomly jumping to another frequency in a second slot.

Further, the SRS may be used for measuring a downlink channel quality under the assumption that radio channels are reciprocal between the uplink and the downlink. The assumption is particularly effective in a time division duplex (TDD) system in which the uplink and the downlink share the same frequency spectrum and are separated in a time domain.

The SRS subframes transmitted by a certain UE in a cell may be represented by a cell-specific broadcast signal. A 4 bit cell-specific 'srsSubframeConfiguration' parameter represents 15 available subframe arrays through which the SRS may be transmitted over each radio frame. The arrays provide flexibility for adjustment of SRS overhead according to a deployment scenario.

A 16-th array completely turns off a switch of the SRS in the cell and this is primarily suitable for a serving cell that serves high-speed terminals.

Figure 9:
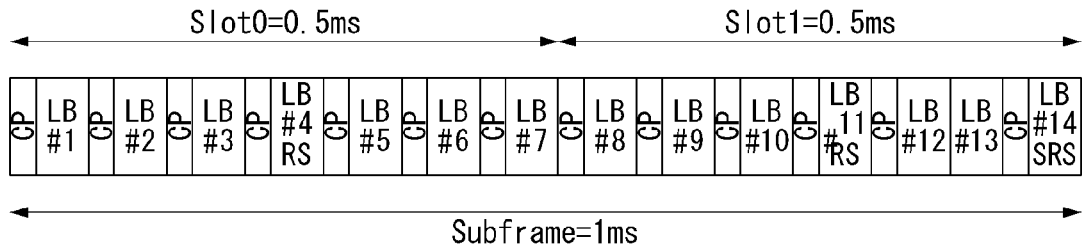
FIG. 9 illustrates an uplink subframe including a sounding reference signal symbol in a wireless communication system to which the present invention may be applied.

FIG. 9 illustrates an uplink subframe including a sounding reference signal symbol in a wireless communication system to which the present invention may be applied.

Referring to FIG. 9, the SRS is continuously transmitted on the last SC-FDMA symbol on the arranged subframe. Therefore, the SRS and the DMRS are located in different SC-FDMA symbols.

PUSCH data transmission is not allowed in a specific SC-FDMA symbol for SRS transmission and as a result, when the sounding overhead is the highest, that is, even if SRS symbols are included in all subframes, the sounding overhead does not exceed approximately 7%.

Each SRS symbol is generated by a basic sequence (random sequence or a sequence set based on Zadoff-Ch (ZC)) for a given time unit and frequency band, and all terminals in the same cell use the same basic sequence. In this case, the SRS transmissions from a plurality of UEs in the same cell at the same time in the same frequency band are orthogonal by different cyclic shifts of the basic sequence, and are distinguished from each other.

By assigning different basic sequences to respective cells, the SRS sequences from different cells may be distinguished, but orthogonality between different basic sequences is not guaranteed.

As more and more communication devices require larger communication capacity, there is a need for improved mobile broadband communication compared to the existing radio access technology (RAT). Massive machine type communications (MTCs), which provide various services anytime and anywhere by connecting many devices and objects, are one of the major issues to be considered in the next generation communication. In addition, a communication system design considering a service/UE sensitive to reliability and latency is being discussed.

The introduction of next generation radio access technology considering enhanced mobile broadband communication, massive MTC, ultra-reliable and low latency communication (URLLC) is discussed, and in the present invention, the technology is called new RAT for convenience.

Self-Contained Subframe Structure

Figure 10:
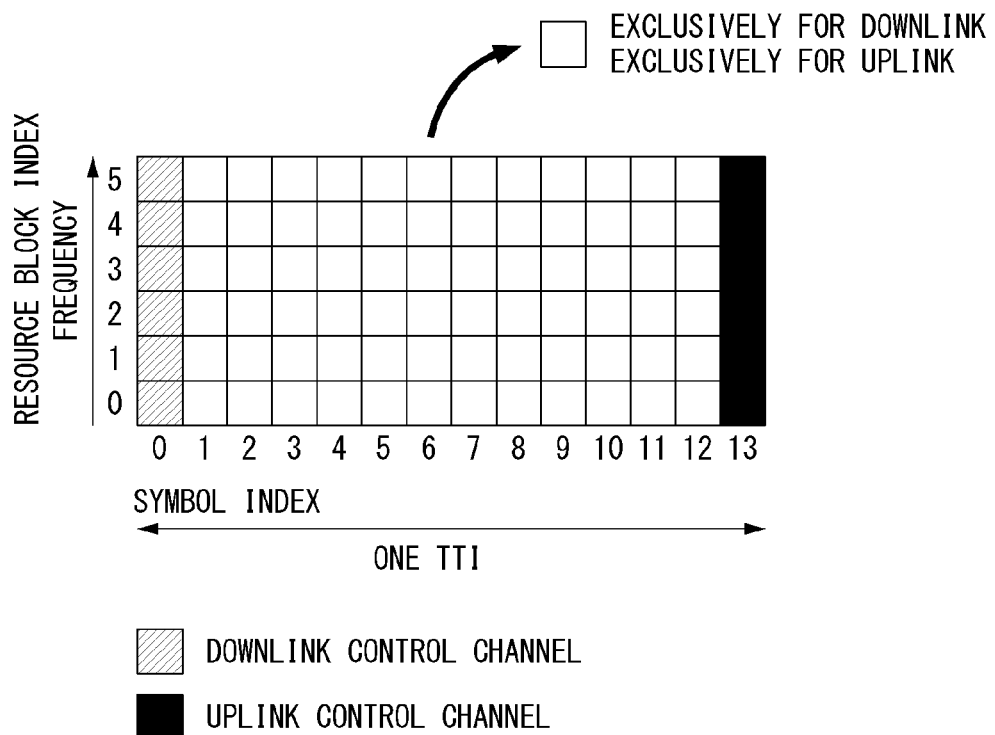
FIG. 10 is a diagram illustrating a self-contained subframe structure in the wireless communication system to which the present invention may be applied.

FIG. 10 is a diagram illustrating a self-contained subframe structure in the wireless communication system to which the present invention may be applied.

In a TDD system, in order to minimize the latency of data transmission, a 5 generation (5G) new RAT considers a self-contained subframe structure as shown in FIG. 10.

In FIG. 10, a dashed area (symbol index of 0) indicates a downlink (DL) control area and a black area (symbol index of 13) indicates an uplink (UL) control area. An unmarked area may also be used for DL data transmission or for UL data transmission. Such a structure is characterized in that DL transmission and UL transmission are sequentially performed in one subframe, and DL data is transmitted in a subframe, and UL ACK/NACK may also be received. As a result, it takes less time to retransmit data when a data transmission error occurs, thereby minimizing the latency of final data transmission.

In such a self-contained subframe structure, there is a need for a time gap between the base station and the UE for the conversion process from the transmission mode to the reception mode or from the reception mode to the transmission mode. For this end, some OFDM symbols at the time of switching from DL to UL in the self-contained subframe structure are configured to a guard period (GP).

Analog Beamforming

In a millimeter wave (mmW), a wavelength is shortened, so that a plurality of antenna elements may be installed in the same area. That is, a total of 64 (8×8) antenna elements may be installed in a 2-dimension array at a 0.5 lambda (that is, wavelength) interval on a panel of 4×4 (4 by 4) cm with a wavelength of 1 cm in a 30 GHz band. Therefore, in the mmW, it is possible to increase a beamforming (BF) gain to increase coverage or increase throughput by using multiple antenna elements.

In this case, if a transceiver unit (TXRU) is provided so that transmission power and phase may be adjusted for each antenna element, independent beamforming is possible for each frequency resource. However, when the TXRUs are installed on all 100 antenna elements, there is a problem that effectiveness is deteriorated in terms of costs. Therefore, a method of mapping a plurality of antenna elements to one TXRU and adjusting a direction of a beam using an analog phase shifter is considered. Such an analog BF method has a disadvantage in that frequency selective BF may not be performed by making only one beam direction in all bands.

A hybrid BF with B TXRUs, which is an intermediate form of digital BF and analog BF, and fewer than Q antenna elements, may be considered. In this case, although there is a difference depending on a connection method of B TXRUs and Q antenna elements, the number of directions of the beams that may be transmitted at the same time is limited to B or less.

Hereinafter, representative examples of a method of connection method of TXRUs and antenna elements will be described with reference to the accompanying drawing.

Figure 11:
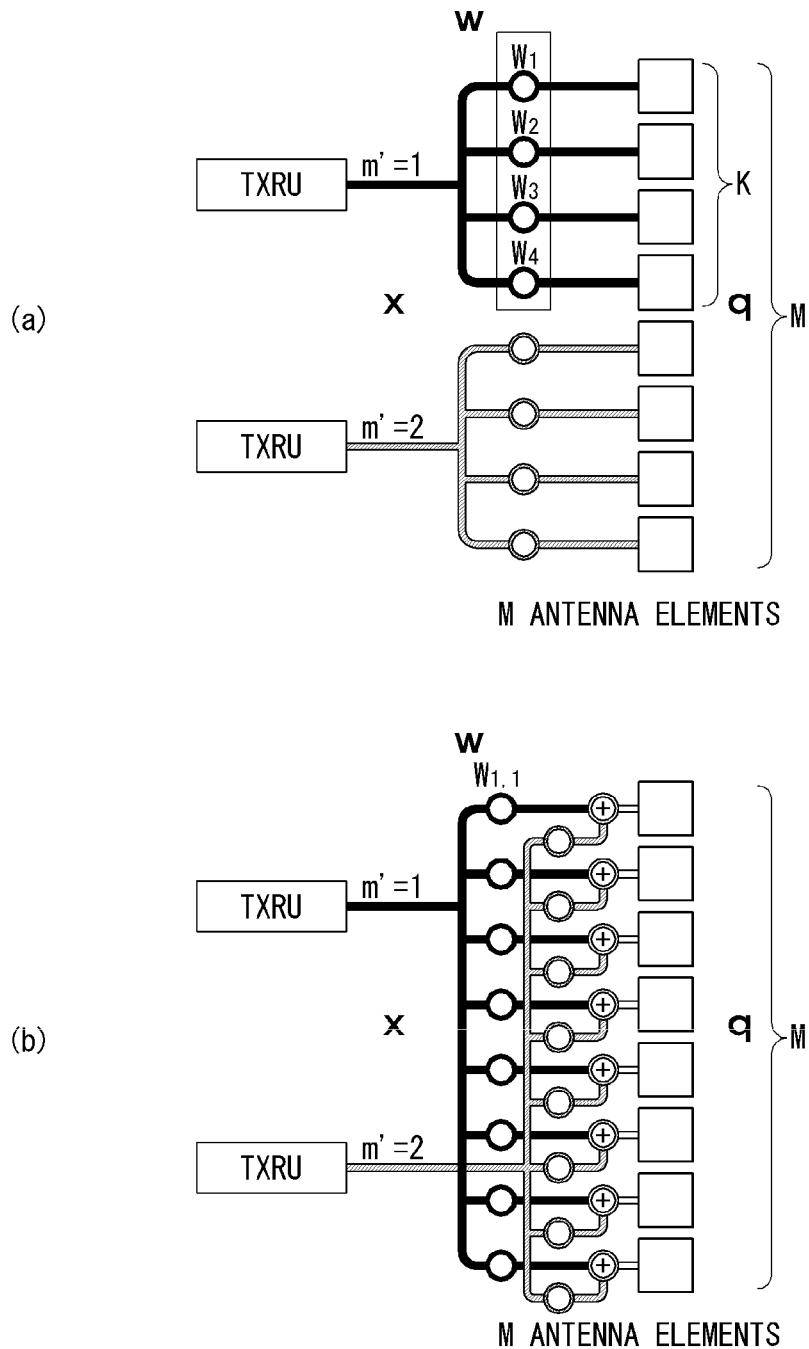
FIG. 11 illustrates a transceiver unit model in the wireless communication system to which the present invention may be applied.

FIG. 11 shows a transceiver unit model in a radio communication system to which the present invention may be applied.

A TXRU virtualization model shows a relationship between an output signal of the TXRUs and an output signal of the antenna elements. According to the correlation between the antenna element and the TXRU, The TXRU virtualization model may be divided into TXRU virtualization model option-1 and a sub-array partition model as illustrated in FIG. 11(a) and TXRU virtualization model option-2 and a full-connection model as illustrated in FIG. 11 (b).

Referring to FIG. 11(a), in the case of the sub-array partition model, the antenna element is divided into multiple antenna element groups and each TXRU is connected to one of the groups. In this case, the antenna element is connected to only one TXRU.

Referring to FIG. 11(b), in the case of the full-connection model, signals of multiple TXRUs are combined and transmitted to a single antenna element (or an array of antenna elements). That is, a scheme is illustrated, in which the TXRU is connected to all antenna elements. In this case, the antenna element is connected to all TXRUs.

In FIG. 11, q represents a transmission signal vector of antenna elements having M co-polarized waves in one column. w represents a wideband TXRU virtualization weight vector and W represents a phase vector multiplied by an analog phase shifter. In other words, the direction of analog beamforming is determined by W. x represents a signal vector of M_TXRU TXRUs.

Herein, mapping of the antenna ports and the TXRUs may be 1-to-1 or 1-to-many.

In FIG. 11, the mapping (TXRU-to-element mapping) between the TXRU and the antenna element is merely an example, and the present invention is not limited thereto. The present invention may be similarly applied even to mapping between the TXRU and the antenna element, which may be implemented in various other forms in terms of hardware.

Feedback of Channel State Information (CSI)

In a 3GPP LTE/LTE-A system, user equipment (UE) is defined to report channel state information (CSI) to a base station (BS or eNB).

The CSI collectively refers to information that may indicate the quality of a radio channel (or referred to as a link) formed between the UE and the antenna port. For example, a rank indicator (RI), a precoding matrix indicator (PMI), a channel quality indicator (CQI), and the like correspond to the information.

Here, the RI represents rank information of a channel, which means the number of streams received by the UE through the same time-frequency resource. Since this value is determined depending on the long term fading of the channel, the value is fed back from the UE to the BS with a period usually longer than the PMI and the CQI. The PMI is a value reflecting a channel space characteristic and represents a preferred precoding index preferred by the UE based on a metric such as signal-to-interference-plus-noise ratio (SINR). The CQI is a value representing the strength of the channel, and generally refers to a reception SINR that may be obtained when the BS uses the PMI.

In the 3GPP LTE/LTE-A system, the BS configures a plurality of CSI processes to the UE and may receive CSI for each process. Here, the CSI process is constituted by a CSI-RS for signal quality measurement from the BS and a CSI-interference measurement (CSI-IM) resource for interference measurement.

Reference Signal (RS) Virtualization

In the mmW, it is possible to transmit a PDSCH only in one analog beam direction at a time by analog beamforming. In this case, data transmission from the BS is possible only to a small number of UEs in the corresponding direction. Therefore, if necessary, the analog beam direction is differently configured for each antenna port so that data transmission may be simultaneously performed to a plurality of UEs in several analog beam directions.

Figure 12:
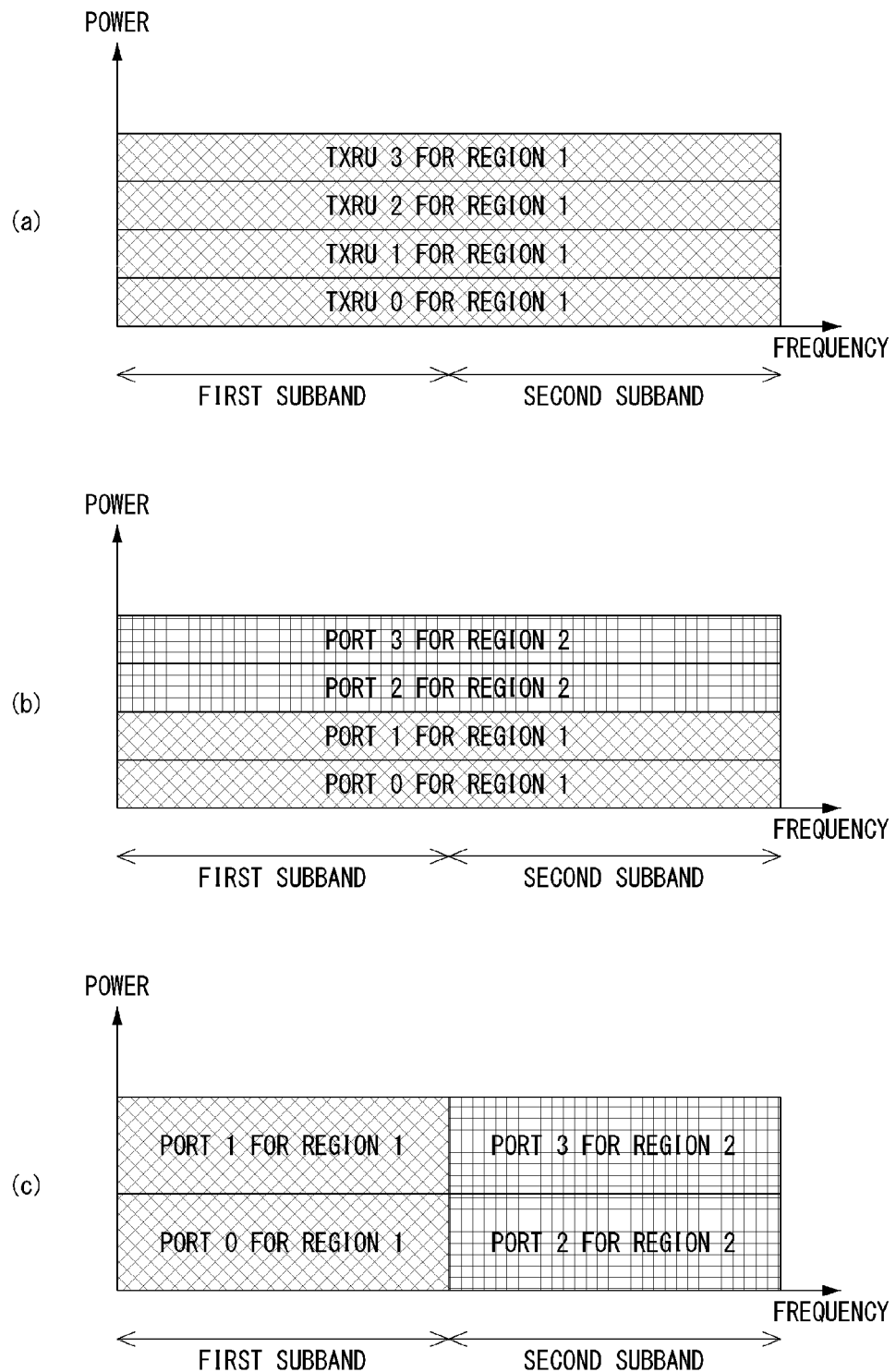
FIG. 12 is a diagram illustrating a service area for each transceiver unit in the wireless communication system to which the present invention may be applied.

FIG. 12 is a diagram illustrating a service area for each transceiver unit in the wireless communication system to which the present invention may be applied.

In FIG. 12, 256 antenna elements are divided into 4 parts to form a 4 sub-arrays, and the structure of connecting the TXRU to the sub-array will be described as an example as shown in FIG. 11 above.

When each sub-array is constituted by a total of 64 (8×8) antenna elements in the form of a 2-dimensional array, specific analog beamforming may cover an area corresponding to a 15-degree horizontal angle area and a 15-degree vertical angle area. That is, the zone where the BS should be served is divided into a plurality of areas, and services are provided one by one at a time.

In the following description, it is assumed that the CSI-RS antenna ports and the TXRUs are 1-to-1 mapped. Therefore, the antenna port and the TXRU have the same meaning as the following description.

As shown in FIG. 12(a), if all TXRUs (antenna ports, sub-arrays) (that is, TXRU 0, 1, 2, 3) have the same analog beamforming direction (that is, region 1), the throughput of the corresponding zone may be increased by forming digital beam with higher resolution. Also, it is possible to increase the throughput of the corresponding zone by increasing the rank of the transmission data to the corresponding zone.

As shown in FIGS. 12(b) and 12(c), if each TXRU (antenna port, sub-array) (that is, TXRU 0, 1, 2, 3) has a different analog beamforming direction (that is, region 1 or region 2, the data may be transmitted simultaneously to UEs distributed in a wider area in the subframe (SF).

As an example shown in FIGS. 12(b) and 12(c), two of the four antenna ports are used for PDSCH transmission to UE1 in region 1 and the remaining two antenna ports are used for PDSCH transmission to UE2 in region 2.

Particularly, in FIG. 12(b), PDSCH1 transmitted to UE1 and PDSCH2 transmitted to UE2 represent examples of spatial division multiplexing (SDM). Unlike this, as shown in FIG. 12(c), PDSCH1 transmitted to UE1 and PDSCH2 transmitted to UE2 may also be transmitted by frequency division multiplexing (FDM).

Among a scheme of serving one area using all the antenna ports and a scheme of serving many areas at the same time by dividing the antenna ports, a preferred scheme is changed according to the rank and the modulation and coding scheme (MCS) servicing to the UE for maximizing the cell throughput. Also, the preferred method is changed according to the amount of data to be transmitted to each UE.

The BS calculates a cell throughput or scheduling metric which may be obtained when one area is served using all the antenna ports, and calculates the cell throughput or scheduling metric which may be obtained when two areas are served by dividing the antenna ports. The BS compares the cell throughput or the scheduling metric which may be obtained by each scheme to select the final transmission scheme. As a result, the number of antenna ports participating in PDSCH transmission is changed by SF-by-SF. In order for the BS to calculate the transmission MCS of the PDSCH according to the number of antenna ports and reflect the calculated transmission MCS to a scheduling algorithm, the CSI feedback from the appropriate UE is required.

Beam Reference Signal (BRS)

Beam reference signals are transmitted on one or more antenna ports ($p=\{0, 1, \ldots, 7\}$).

The reference-signal sequence '$r\_l(m)$' may be defined by Equation 14 below.

$$r_l(m) = \frac{1}{\sqrt{2}}(1 - 2 \cdot c(2m)) + j\frac{1}{\sqrt{2}}(1 - 2 \cdot c(2m+1)), \quad [\text{Equation 14}]$$

$$m = 0, 1, \ldots, 8 \cdot (N_{RB}^{max,DL} - 18) - 1$$

Where $l=0, 1, \ldots, 13$ is the OFDM symbol number. $N\_RB^{max,DL}$ represents the largest downlink band configuration and $N\_sc^{RB}$ is expressed by a multiple. $N\_sc^{RB}$ represents the size of the resource block in the frequency domain and is expressed by the number of subcarriers.

In Equation 14, c(i) may be predefined as a pseudo-random sequence. The pseudo-random sequence generator may be initialized at the start of each OFDM symbol by using Equation 15 below.

$$C_{init} = 2^{10} \cdot (7 \cdot (n_s+1)+l'+1) \cdot (2 \cdot N_{ID}^{cell}+1)+2 \cdot N_{ID}^{cell}+1 \quad [\text{Equation 15}]$$

Where N_ID^cell represents a physical layer cell identifier. n_s=floor(l/7) and floor($\lambda$) represents a floor function for deriving a maximum integer of x or less. l'=l mod 7 and mod represents a modulo operation.

Beam Refinement Reference Signal (BRRS)

Beam refinement reference signals (BRRSs) may be transmitted on up to eight antenna ports ($p=600, \ldots, 607$). The transmission and reception of the BRRS are dynamically scheduled in the downlink resource allocation on xPDCCH.

The reference-signal sequence '$r\_l,ns(m)$' may be defined by Equation 16 below.

$$r_{l,n_s}(m) = \frac{1}{\sqrt{2}}(1 - 2c(2m)) + j\frac{1}{\sqrt{2}}(1 - 2c(2m+1)), \quad [\text{Equation 16}]$$

$$m = 0, 1, \ldots, \left\lfloor \frac{3}{8} N_{RB}^{max,DL} \right\rfloor - 1$$

Where n_s represents the slot number in the radio frame. l represents the OFDM symbol number in the slot. c(i) may be predefined as the pseudo-random sequence. The pseudo-random sequence generator may be initialized at the start of each OFDM symbol by using Equation 17 below.

$$c_{init} = 2^{10}(7(\bar{n}_s+1+l+1)(2N_{ID}^{BRRS}+1)+2N_{ID}^{BRRS}+1 \quad [\text{Equation 17}]$$

$\bar{n}_s = n_s \mod 20$

Herein, N_ID^BRRS is configured to the UE through the RRC signaling.

DL Phase Noise Compensation Reference Signal

Phase noise compensation reference signals associated with xPDSCH may be transmitted on antenna port(s) p=60 and/or p=61 according to the signaling in the DCI. Further, the phase noise compensation reference signals associated with xPDSCH may be present as a valid reference for phase noise compensation only if the xPDSCH transmission is associated with the corresponding antenna port. In addition, the phase noise compensation reference signals associated with xPDSCH may be transmitted only on the physical resource blocks and symbols upon which the corresponding xPDSCH is mapped. Moreover, the phase noise compensation reference signals associated with xPDSCH may be identical in all symbols with xPDSCH allocation.

For any antenna port $p \in \{60,61\}$, the reference-signal sequence '$r(m)$' is defined by Equation 18 below.

$$r(m) = \frac{1}{\sqrt{2}}(1 - 2 \cdot c(2m)) + j\frac{1}{\sqrt{2}}(1 - 2 \cdot c(2m+1)), \quad [\text{Equation 18}]$$

$$m = 0, 1, \ldots, \lfloor N_{RB}^{max,DL}/4 \rfloor - 1$$

Herein, c(i) may be predefined as the pseudo-random sequence. The pseudo-random sequence generator may be initialized at the start of each subframe by using Equation 19 below.

$$c_{init} = (\lfloor n_s/2 \rfloor+1) \cdot (2n_{ID}^{(nSCID)}+1) \cdot 2^{16}+n_{SCID} \quad [\text{Equation 19}]$$

Where n_SCID is 0 if unless specified otherwise. In the xPDSCH transmission, n_SCID is given in a DCI format associated with the xPDSCH transmission.

n_ID^(i) (where i=0, 1) is given as follows. When the value of n_ID^PCRS,i is not provided by the higher layer, n_ID^(i) is equal to N_ID^cell. If not, n_ID^(i) is equal to n_ID^PCRS,i.

The following techniques are discussed for new RAT (NR) uplink (UL) multi-input multi-output (MIMO).

i) Uplink transmission/reception schemes for data channels

Non reciprocity based UL MIMO (e.g., PMI based)

Reciprocity based UL MIMO (e.g., UE derives precoder based on downlink RS measurement (including partial reciprocity)

Support of multi user (MU)-MIMO

Open-loop/Close-loop single/Multi point spatial multiplexing (SM)

For example, for multi point SM, multi layers are received either jointly or independently by different transmit reception points (TRPs).

For multi point SM, multiple points may be coordinated.

Single/Multi panel spatial diversity

Uplink antenna/panel switching (UE side)

UL beamforming management for analog implementation

Combination of above techniques ii) UL RS design considering the below functions Sounding Demodulation Phase noise compensation iii) UL transmit power/timing advance control in the context of UL MIMO iv) Transmission scheme(s) for carrying UL control information v) Other UL MIMO and related techniques are not limited.

The following aspects for UL MIMO transmission should be supported:

i) Transmission schemes/methods for reciprocity calibrated UEs, reciprocity non-calibrated UEs, and non-reciprocity/partial reciprocity cases If needed, signaling associated with UL reciprocity based operation is introduced. For example, UE capability which indicates calibration accuracy Whether to differentiate reciprocity non-calibrated UEs from non-reciprocity or not is to be discussed.

The number of transmission schemes/methods may be further discussed.

ii) At least one of the following candidate schemes/methods is to be supported.

Candidate 1: Codebook Based Transmission

Frequency selective and frequency non-selective precoding in digital domain may be considered for a wide system bandwidth. The support for the frequency selective precoding is determined according to decision on NR waveform(s). The value of the wide system bandwidth will be discussed later.

For example, base station (BS)-based which is analogous to the LTE

For example, UE-aided and BS-centric mechanism: The UE recommends candidate UL precoders from a predefined codebook to BS based on DL RS measurement. In addition, the BS determines the final precoder taken from the codebook.

For example, UE-centric and BS-aided mechanism: The BS provides CSI (e.g. channel response, interference-related information) to the UE. In addition, the UE determines the final precoder based on the information from the BS.

Candidate 1: Non-Codebook Based Transmission

Frequency selective and frequency non-selective precoding in digital domain may be considered for the wide system bandwidth. The support for the frequency selective precoding is determined according to decision on NR waveform(s). The value of the wide system bandwidth will be discussed later.

For example, reciprocity based (DL RS based) transmission only for calibrated UEs For example, UE-aided and BS-centric mechanism: The UE recommends candidate UL precoders to the BS based on DL RS measurement. In addition, the BS determines the final precoder.

For example, UE-centric and BS-aided mechanism: The BS provides CSI (e.g. channel response, interference-related information) to the UE. In addition, the UE determines the final precoder based on the information from the BS.

Other transmission schemes/methods are not limited.

i) Discussion of UL precoder signaling for frequency selective/non-selective precoding Example 1: Signaling of Single or Multiple PMIs Via DL Control and/or Data Channels Multiple PMIs may be signaled via a single DCI or multi-level DCI ($1^{st}$ level DCI contains a location indication to the $2^{nd}$ level DCI).

Example 2: For TDD, Precoder Calculation at the UE Based on DL RS

The implementation of the frequency selective precoding is determined according to RAN1 decision (e.g. NR frame structure, waveform(s)).

An influence on other system design aspects (e.g. DL control channel decoding performance/complexity) should be considered.

ii) Discussion of the use of UL frequency selective precoding for precoded transmission including precoder cycling iii) For frequency selective precoding, discussion of UL precoding granularity (i.e. UL subband size) considering following aspects Implicit (defined by spec.) or explicit (by eNB/UE decision) signaling support Whether to align with DL iv) Evaluation should include UL specific aspects such as cubic metric (CM) analysis according to UL waveform, etc.

v) Discussion of frequency non-selective precoding is of higher-priority.

In the existing LTE standard, when a base station transmits an uplink (UL) grant for UL-MIMO transmission of a UE (e.g., by DCI format 4) to the UE, the base station transmits precoding information (e.g., included in the DCI format) together. Accordingly, the UE performs UL transmission by applying the indicated (single wideband) precoder to scheduled physical resource block(s) (PRB(s)).

As described above, a method for instructing a frequency selective precoder even in the UL is also considered. As a result, it is possible to improve the transmission yield performance by applying a more optimized UL precoder for each subband.

However, unlike the DL, the UL needs to directly instruct the subband precoder at the time of UL grant of the base station, which may cause an excessive control channel overhead in proportion to the number of subbands.

Therefore, the present invention proposes schemes for applying the UL subband precoding while minimizing the UL-related DCI overhead.

In the present invention, a specific UL precoder 'P' is basically described to be divided into a type of P=U1*U2 and the like. Here, it may be divided into U1 as a relative wideband (and/or long-term) precoder attribute and U2 as a relative subband (and/or short-term) precoder attribute.

However, the present invention is not limited thereto, and the operation of the present invention to be described below may be performed based a single PMI (e.g., TPMI) and a precoder.

There is provided a method in which UI information is indicated to be common throughout the subbands and only U2 information is indicated for each subband to be instructed to the UE at the time of UL scheduling (or in association with the UL scheduling).

For example, assuming that a complete P is 6 bits, U1 is 4 bits, and U2 is 2 bits, 6 bits are allocated for each subband without applying a hierarchical structure proposed in the present invention. If the total number is N, a total of 6N bits is consumed in the corresponding UL precoder instruction. On the other hand, according to the proposed method of the present invention, since 6+2N bits are consumed, the number of subbands N increases, thereby contributing to reduction of a control channel overhead.

In this specification, for convenience of the description, a specific frequency axis resource unit is referred to as the "subband", but the present invention is not limited thereto, and it should be understood that the "subband" is commonly referred to as the specific frequency axis resource unit. For example, the term of subband may be changed/mixed with each other in all/some description of the present invention, such as RB, PRB, PRB group (e.g., PRG (PRB Group)).

U1 Information Relation

For an environment (e.g., similar to an open-loop method, a case where a terminal speed is high, etc.) in which it is advantageous to selectively instruct widely-spaced beams for each subband, rather than an environment in which it is advantageous to selectively instruct closely-spaced beam for each subband due to channel characteristics, a U1 codebook may also be configured as a widely-spaced beam.

In the above described example, 4 bits of U1 means that a total of 16 different U1 information may be indicated. Each U1 information may include specific beam vectors to be selected in the U2. As an example, each U1 may be constituted by a set of discrete fourier transform (DFT) vectors as many as the number of UL transmission antenna ports of the UE (e.g., the number of the ports may be transmitted in advance by the UE in a SRS form).

In this case, each U1 index may be designed in the form of a closely-spaced beam group. As a result, it is advantageous that the base station instructs UL scheduling by configuring the UI by peripheral candidate beam vectors including a final specific beam direction which intends to instruct the corresponding UE at the time of the UL scheduling. That is, since U1 is the relative wideband (and/or long-term) precoder attribute, it is advantageous that the beams to select/instruct the final beam optimized for each subband are stored in U1, and each U1 information should be designed so that such an effect may be appropriately exhibited.

In the present invention, it is possible to define/configure at least one different codebook such as a "closely-spaced beam group", a "widely-spaced beam group", and/or a "beam group composed of a specific form (e.g., eNB-configurable). In addition, the base station may configure/instruct which U1 and/or U2 codebook the UE needs to apply at the time of the UL scheduling (e.g., by DCI) or separate signaling before the UL scheduling. As a result, although such a U1 codebook itself may be fixed as one, like the present invention, there is an advantage that a more flexible codebook may be operated by supporting a function of changing/activating/re-activating by configuring/instructing the base station.

U2 Information Relation

In the above described example, 2 bits of U1 means that a total of 4 different U2 information may be indicated. Each U2 information may be configured in a form in which a beam group corresponding to the above indicated U1 index may include four specific beam vectors and the 2-bit U2 selection index indicates which beam among the beams is to be finally applied for each subband.

In addition, in the example described above, when UI is 4 bits, U2 may exceed 2 bits. For example, if U2 is 4 bits, 2 bits are allocated as a "beam selector" so that total four different pieces of U2 information may be indicated. In order to connect the corresponding beam in the form of co-phasing (e.g., QPSK (Quadrature Phase Shift Keying) "co-phasing")), 2 bits may be allocated and thus the total U2 may be configured as 4 bits. The co-phasing is configured in the form of cross-polarized antennas between the specific (two) transmission antenna port groups of the UE and the same beam may be applied so as to configure a precoder in the form of co-phasing by applying a group-phase between the same groups of ports.

Alternatively, it is apparent that "co-phasing" may allocate only 1 bit to apply, for example, BPSK co-phasing and the bit width of the "beam selector" may be modified/changed according to the transmission antenna port configuration of the UE and the U1/U2 codebook structure.

The U2 information is mapped/indicated for each subband, and may be configured/indicated together by interlocking with the UL resource allocation (RA) field scheduled for the corresponding UE.

For example, if resource allocation information of the corresponding UL grant message is in the form of a specific PRB bitmap (e.g., if each bit is '1', the corresponding PRB is included in the scheduled PRB and if each bit is '0', the corresponding PRB is not included), the structure may extend so as to store K-bit information for each PRB index without using a bitmap of '1' or '0'. That is, the information may correspond to one PRB for each K bit in the bit map. As such, in one embodiment of the present invention, there is proposed a structure to transmit the U2 information through the corresponding 2^K state for each PRB.

For example, if K=2, a specific default state may be defined/configured for each PRB as follows.

'00' indicates that "the corresponding PRB is not included in the scheduled PRB"

'01' indicates that "the corresponding PRB is included in the scheduled PRB and the first precoder in U1 is applied"

'10' indicates that "the corresponding PRB is included in the scheduled PRB and the second precoder in U1 is applied"

'11' indicates that "the corresponding PRB is included in the scheduled PRB and the third precoder in U1 is applied"

Such an encoding method is just an example, and the description of the state such as '01', '10', and '11' may be defined in a different form or the base station may be changed/configured by a higher layer signal such as RRC signaling. As described above, when the description of the state is defined/supported in the form of parameters configurable by the base stain (e.g., by RRC signaling), it is advantageous that the configuration flexibility of the base station may be increased.

As such, as the scheduling information and the U2 information are jointly encoded in one bitmap, it is possible to reduce the signaling overhead compared with the case of configuring a bitmap for transmitting the scheduling information and a bitmap for transmitting the U2 information, respectively.

In addition, the RA field is maintained as a 1-bit unit bitmap, and may be applied even in the form that a bitmap in units of K-bits for transmitting the U2 information per subband (per PRB/PRG) is provided as a separate field (or provided separately (at an independent time) as a separate DCI). That is, a separate field indicating K-bit (U2) precoder information for each subband corresponding to a specific PRB(s) in the scheduled PRB area indicated in the RA field may be defined/configured.

Operation Relation Associated with Specific Uplink Reference Signal (UL RS) (e.g., SRS) (for Link Adaptation (LA)

In association with some of the operations proposed in the present invention, a specific RS (e.g., SRS) transmission may be configured/implemented by the UE in order to determine the UL precoder at the base station.

Hereinafter, for convenience of description, the uplink RS is referred to as SRS, but the present invention is not limited thereto.

1) Type 1 UL-LA UE (UL-LA process operation by starting Precoded SRS transmission):

Such a SRS may be first defined/configured to transmit a specific Precoded SRS. In this case, the base station measures the precoded SRS of the specific port(s) to determine the proposed U1 and/or U2 information. Thereafter, the base station transmits a UL scheduling grant (e.g., in case of U1, may be separately transmitted to the UE via a separate DCI (field) or a separate message container for specific control information delivery (by L1 and/or L2 signaling) including the determined U1 and/or U2 information. Accordingly, there is disclosed frequency-selective UL-MIMO scheduling considered in the present invention.

A type in which a UL link adaptation (UL-LA) process is initiated by starting the precoded SRS transmission without (that is, omitting) the transmission procedure of the specific non-precoded SRS may be referred to as a Type 1 UL-LA operation (or UE).

That is, the UE may transmit precoded/beamformed SRS ports applying, for example, analog beamforming in a specific direction through the corresponding specific precoded SRS. In addition, the base station measures the (analog-)beamformed SRS ports to derive appropriate U1 and/or U2 and then informs the derived U1 and/or U2 to the UE by the method described above to apply the UL transmission.

More specifically, the corresponding beamforming vectors/coefficients to be applied to the precoded/beamformed SRS by the UE may be determined as follows. First, the UE may measure a DL specific RS (e.g., radio resource management-RS (RRM-RS), BRS, BRRS, etc.) transmitted by the base station. In addition, the UE finds (and also reports) the best "serving-beam" to determine (paired) best "Rx-receiving-beam" of the UE itself. Then, the UE may transmit the SRS by applying the corresponding beamforming vectors/coefficients, when transmitting the precoded/beamformed SRS, by inverting (e.g., taking Hermitian) the best "Rx-receiving-beam" using the DL/UL channel reciprocity characteristic. That is, the SRS transmission may be performed with the same spatial filtering as the spatial filtering used for the reception of a specific DL RS (e.g., the best "serving-beam"). The operation of the UE may be defined in advance or configured in the UE.

Alternatively, it is not necessarily limited to applying only the "Rx-receiving-beam" corresponding to the best "serving-beam". For example, the operation may be supported such that the base station may instruct/trigger precoded/beamformed SRS transmissions applying the "Rx-receiving-beam" corresponding to the second-best "serving-beam".

Such a method is generalized, and thus, in the same manner as corresponding to a third-best "serving-beam", corresponding to a fourth-best "serving-beam", . . . , a specific identifier (e.g., beam state information (BSI), etc.) may be instructed from the base station so as to recognize the corresponding n-th "serving-beam". In such as form, the beamforming vectors/coefficients to be applied by the UE, when transmitting the precoded/beamformed SRS, may be configured/indicated.

In other words, the UE may transmit the beamforming vectors/coefficients using the same spatial filtering as the spatial filtering used for reception of the specific DL RS when transmitting the SRS. That is, the UE may implement spatial filtering that is optimal for DL RS reception for each DL RS, and the base station may instruct the UE to perform transmission of a specific SRS resource using the same spatial filtering as the spatial filtering used by the UE for receiving a specific DL RS.

Alternatively, a method of directly configuring/instructing, by the base station, beamforming vectors/coefficients to be applied by the UE when transmitting the precoded SRS to the UE may be applied (e.g., a case where the base station may acquire the information based on channel reciprocity, for example, according to another specific method, and the like). The base station may directly inform the beamforming vectors/coefficients to the UE through a control channel such as a specific DCI triggering the transmission of the corresponding precoded SRS or through a separate specific layer 1 (L1), layer 2 (L2), and/or layer 3 (L3) (e.g. semi-static by RRC) signaling.

As a result, the Type 1 UL-LA UE to which the operation is applicable may be limited as i) "channel-reciprocity calibrated UE (e.g., NR (or 5G) UE, 3GPP release-15 and later UEs, etc.)", ii) "UE not performing fully-digital-beamforming in the transmitter (TX) (and/or transmitter and receiver (TRX)) antennas/ports of the UE", iii) "UE applying analog-beamforming to UL TX ports", and/or iv) "UE operating in TDD".

In addition/alternatively, the UE provides its own specific capability (e.g., whether or not the Type 1-related support is available, etc.) associated with this to the base station in advance, and thus, the above operation/process may be configured/initiated.

2) Type 2 UL-LA UE (UL-LA process operation by starting Precoded SRS transmission)

Regarding such an SRS, the UE may be defined/configured to transmit a Non-precoded SRS. In this case, the base station measures the non-precoded SRS of the specific port(s) to determine the proposed U1 and/or U2 information. Thereafter, the base station transmits a UL scheduling grant (e.g., in case of U1, may be separately transmitted to the UE via a separate DCI (field) or a separate message container for specific control information delivery (by L1 and/or L2 signaling) including the determined U1 and/or U2 information. Accordingly, there is disclosed frequency-selective UL-MIMO scheduling considered in the present invention.

As such, a type, in which a UL link adaptation (UL-LA) process is initiated only by transmission of a specific non-precoded SRS and the base station informs the final UL precoder such as U1 and/or U2, etc. determined by measuring the non-precoded SRS of the specific port(s) to the UE when UL scheduling, is referred to as a Type 2 UL-LA operation (or UE).

More specifically, this Type 2 UE may mean UE in which TX (and/or TRX) antennas/ports of the UE are fully-digital-beamformable.

As a result, the Type 2 UL-LA UE to which the operation is applicable may be limited as i) "channel-reciprocity non-calibrated UE" (e.g., LTE/LTE-A UE, UE up to 3GPP release-14), ii) "fully-digital-beamforming possible UE", and/or iii) "UE operating in FDD (and/or TDD)", etc.

In addition/alternatively, the UE provides its own specific capability (e.g., whether or not the Type 2-related support is available, etc.) associated with this to the base station in advance, and thus, the above operation/process may be configured/initiated.

3) Type 3 UL-LA UE (UL-LA process operation by receiving specific beamforming information from the base station by starting (S1 ports) Non-precoded SRS transmission and initiating (S2(<=S1)) ports precoded SRS transmission by applying the received information Alternatively, regarding such an SRS, the UE may be configured/indicated to transmit a specific (S1 ports) non-precoded SRS primarily (with a long-term period) by the UE so that the base station derives primary beamforming vectors/coefficients. In addition, the base station instructs the beamforming vectors/coefficients to the UE to transmit a secondary specific (S2(<=S1) ports) precoded SRS. In this case, there is only a difference in that a coarse beam estimation operation by the primary non-precoded SRS is added. In other words, the base station measures the (S2 (<=S1) ports) Precoded SRS to determine the proposed U1 and/or U2 information. Thereafter, the base station transmits a UL scheduling grant (e.g., in case of U1, may be separately transmitted to the UE via a separate DCI (field) or a separate message container for specific control information delivery (by L1 and/or L2 signaling) including the determined U1 and/or U2 information. Accordingly, there is disclosed frequency-selective UL-MIMO scheduling considered in the present invention.

At this time, as a method for configuring/instructing to the UE to apply the beamforming vectors/coefficients derived (by receiving the non-precoded SRS in the base station) to the corresponding precoded SRS, the base station may directly inform the beamforming vectors/coefficients to the UE through a control channel such as a specific DCI triggering the transmission of the corresponding precoded SRS or separately specific L1, L2, and/or L3 (e.g., semi-static by RRC) signaling.

As such, a type, in which transmission of a specific non-precoded SRS is included and transmission of a specific precoded SRS is initiated by receiving the information related to the application of the beamforming from the base station and applying the received information, and the base station informs the final UL precoder such as U1 and/or U2, etc. determined by measuring the precoded SRS to the UE when UL scheduling is referred to as a Type 3 UL-LA operation (or UE).

More specifically, this Type 3 UE may mean UE in which TX (and/or TRX) antennas/ports of the UE are fully-digital-beamformable.

As a result, the Type 2 UL-LA UE to which the operation is applicable may be limited as i) "channel-reciprocity non-calibrated UE", ii) "UE not performing fully-digital-beamforming in the TX (and/or TRX) antennas/ports of the UE", iii) "UE applying analog-beamforming to UL TX ports", and/or iv) "UE operating in FDD (and/or TDD)".

In addition/alternatively, the UE provides its own specific capability (e.g., whether or not the Type 3-related support is available, etc.) associated with this to the base station in advance, and thus, the above operation/process may be configured/initiated.

In addition/alternatively, a specific SRS resource(s) is configured in advance in the UE, and the UE may be configured to transmit a separate precoded SRS based on each SRS resource configuration. At this time, the number of SRS ports per SRS resource may be one or more.

That is, the UE may perform the SRS transmission based on the number of SRS ports corresponding to each SRS resource and corresponding configuration.

At this time, the beamforming vectors/coefficients to be applied at this time are selected arbitrarily (eNB-transparently, randomly) or selected according to the indication of the base station and the UE may transmit the precoded SRS for each SRS resource. In this case, the base station first selects a SRS resource with the highest reception quality through the SRS measurement for each SRS resource and derives the U1 and/or U2 with respect to the SRS ports in the SRS resource and indicates the U1 and/or U2 to the UE. That is, the base station derives the U1 and/or U2 to be applied to the SRS ports in the corresponding SRS resource to indicate the derived U1 and/or U2 to the UE.

In this case, a UL scheduling grant (e.g., U1 and/or SRI) including not only the proposed U1 and/or U2 information but also the best SRS resource indicator (e.g., U1 and/or SRI may be separately transmitted to the UE through a separate DCI (field) or a separate message container for transmitting specific control information (by L1, L2, and/or L3 (e.g., semi-static by RRC) signaling)) is transmitted. Accordingly, there is disclosed a frequency-selective UL-MIMO scheduling considered in the present invention.

In other words, the base station configures multiple SRS resources to the UE, and the UE may transmit a precoded SRS having different beam directions for each SRS resource to the base station. In addition, the base station informs the UE of the uplink scheduling grant (DCI) including the SRI and the precoding indication (e.g., U1 and/or U2, or transmitted precoding matrix indicator (TPMI)) transmitted by the UE in the previous time instance. In this case, the precoding indication may be used to indicate preferred precoder over the SRS ports in the selected SRS resource by the SRI.

For example, if a specific SRS resource is configured to transmit a 1-port SRS, when the UE implements X transmission antenna(s)/port(s), the UE may be defined/configured to transmit a type of "rank 1 precoded SRS" by applying specific X-by-1 beamforming vector/coefficients.

Similarly, if the specific SRS resource is configured to transmit a v(>1)-port SRS, when the UE implements X(>=v) transmission antenna(s)/port(s), the UE may be defined/configured to transmit a type of "rank v precoded SRS" by applying specific X-by-v beamforming vector/coefficients.

That is, there may be a characteristic of the corresponding "SRS port number=(target) rank number" configured for each SRS resource.

Accordingly, when the base station configures/instructs the SRI to the UE, it may be recognized that the SRI includes a meaning of a kind of rank indication. In addition, the SRI may be defined/configured to be applied at the time of interpretation of other fields within the corresponding UL grant based on the indicated rank.

In other words, the number of SRS antenna ports may be predefined or configured for each SRS resource (for example, by higher layer signaling such as RRC), and when the base station transmits the UL grant including the SRI to the UE, the number of ranks for transmission of uplink data (e.g., PUSCH) of the UE may be determined as the number of antenna ports corresponding to the SRS resources indicated by the SRI.

As another example, it is possible to omit the information indication of the SRI and automatically indicate which SRS resource index is indicated through a rank indication (field) indicated by the UL grant or the like, and the operation may be defined/configured/indicated so that a precoder applied to the corresponding implicitly-indicated SRS resource index is applied when UE's UL transmission (however, it is preferable that only one SRS resource associated with a specific rank is limited to one to one linkage).

Alternatively, as a more flexible UL scheduling related signaling, the base station may be defined/configured to independently inform the rank indication as well as the SRI to the UE. This is a case where one or more SRS resources (s) may be configured for a specific target rank. The reason why the base station configures a plurality of SRS resources for a certain rank is that the UE applies different beamforming vectors/coefficients with respect to the same rank and tries to transmit the SRS several times. That is, the base station measures the precoded SRS with different beam coefficients for the same rank to provide the flexibility to determine and instruct which UL precoder is more advantageous (in terms of performance) even when the corresponding rank is finally selected.

In addition/alternatively, when the UE applies specific "beamforming vectors/coefficients" to the corresponding precoded SRS, the UE may be configured to apply the "beamforming vectors/coefficients" as the beamforming vectors/coefficients which are common over the transmission band as a wideband attribute.

In addition, an operation may be defined or configured to the UE to transmit a subband precoded SRS for the corresponding SRS resource in the form of applying different/independent beamforming vectors/coefficients in a specific subband (or PRB (group)) unit frequency-selectively over the transmission band.

In addition, That is, the base station may designate whether the wideband precoding or subband precoding is applied to the precoded SRS to the UE by L1 (by DCI), L2 (by MAC control element (CE)), and/or L3 (by RRC) signaling.

Even when specific "frequency-selective (subband) beamforming vectors/coefficients" are applied when transmitting specific precoded SRS, the following operation may be defined or configured to the UE.

i) The base station informs the UE of the corresponding "frequency-selective (subband) beamforming vectors/coefficients" (separately or when indicating/triggering the corresponding SRS transmission) so that the UE follows the information.

ii) The UE may select arbitrarily (eNB-transparently, randomly) to transmit (frequency-selective) precoded SRS for each SRS resource.

iii) The UE may find (alternatively, find and report) the best "serving-beam" by measuring Y (e.g., Y=1) DL specific RS (e.g., RRM-RS, BRS, BRRS, etc.) ports transmitted by the base station. In addition, the UE may determine a X-by-Y precoder/beamformer vector/coefficient frequency-selectively (as a dimension by the number X of TRX antennas/ports of the UE) for each subband when the UE determines its own (paired) best "Rx-receiving-beam" to apply the determined X-by-Y precoder/beamformer vector/coefficient reversely (e.g., taking Hermitian) when transmitting the corresponding precoded SRS.

When such RRM-RS type (e.g., BRS, BRRS, etc.) is used, it is limited to Y=1, so that the transmission SRS of the UE may be limited to only a rank 1 precoded SRS.

Further, it is possible to explicitly indicate whether to calculate the X-by-Y precoder for a specific RRM-RS (e.g., BRS, BRRS, etc.) signaling type. In addition, the specific RRM-RS (e.g., BRS, BRRS, etc.) (ports) may be indicated as a quasi co-located (QCL) signaling type.

iv) The UE may determine its own (paired) best "Rx-receiving-beam" by measuring Z(>=1) DL specific (for CSI measurement) RS (e.g., CSI-RS) ports transmitted from the base station. In this case, the UE determine a X-by-Z precoder/beamformer vector/coefficient frequency-selectively (as a dimension by the number X of TRX antennas/ports of the UE) for each subband and apply the determined X-by-Z precoder/beamformer vector/coefficient reversely (e.g., taking Hermitian) when transmitting the corresponding precoded SRS. The operation may be defined or configured to the UE.

In other words, the UE may transmit the SRS using spatial filtering which is the same as spatial filtering used for the reception of a specific DL RS when transmitting the SRS transmission in the specific subband. That is, the UE may implement spatial filtering that is optimal for DL RS reception for each DL RS, and the base station may indicate the UE to perform transmission of a SRS resource in the specific subband using the same spatial filtering as the spatial filtering used by the UE for receiving a specific DL RS.

When CSI-RS is used as such, it may be limited to Z>1, or may be flexibly defined or configured to the UE as Z>=1. The reason for not using the above RRM-RS (e.g., BRS, BRRS) is that it may be limited to only rank 1 because it may be limited to a single port, so it is effective to use CSI-RS to support rank>1.

Further, the UE may be explicitly indicated to calculate the X-by-Z precoder for which specific CSI-RS (port(s)). In addition, the specific CSI-RS (port(s)) may be indicated as a QCL signaling type. In addition/alternatively, the UE may be defined/configured that the corresponding CSI-RSs (port (s)) have a QCL linkage with which RRM-RS (e.g., BRS, BRRS) together or separately.

It will be apparent that all (or some) of the proposed operations associated with the SRS may be applied to the schemes (e.g., a single PMI (TPMI), precoder based scheme) which do not follow the U1 and/or U2 structure. For example, to determine a specific single UL precoder U, the operations may be modified/applied as operations such as giving a specific UL precoder indication for non-precoded/precoded SRS transmissions (by the SRS resource(s) based configuration), or the like.

The expression "SRS resource" is a name given for convenience and as such, the SRS resource may be signaled/indicated to the UE in a form in which a specific index is actually given per SRS resource unit. Alternatively, the operation of the present invention may be applied by another name/parameter which replaces the concept of the "SRS resource" by binding specific/some/virtualized SRS ports(s) grouped by specific grouping with respect to (entire) SRS ports transmittable by the UE.

Additional Proposals

In such an operation, semi-open loop (OL) UL transmission may be configured/indicated to the UE in the form of deleting all U2 information for each subband.

For example, the base station may transmit an UL grant of a type without the U2 information to the UE as described above through a specific (separate) signaling (or using one of the U1 indexes) and this may operate as instructing the UE to perform specific (semi-)OL UL transmission.

When the UE is configured/instructed as described above, the UE may ignore the information even if the U2 information exists in the UL grant.

Alternatively, when the UE is configured/directed as described above, the payloads where U2 information may exist may be deleted from the (UL-related) DCI. In this case, the UE may be defined or configured to perform blind detection (BD) for different payload sizes in a form in which the total payload size of the corresponding DCI is reduced against the case the U2 information exists.

Further, the (semi-)OL UL transmission may be instructed in a form of deleting only the precoder(s) information in the direction of a specific (spatial) dimension of U1 and/or U2.

For example, when the UE determines that the channel change is insignificant in the vertical direction and the channel change is relatively severe in the horizontal direction, the UI and/or U2 information may be indicated in conjunction with UL scheduling in a form in which specific precoder(s) information of a horizontal component is deleted (or ignored or replaced with other information). In this case, the UE may UL-transmit the corresponding part by applying an OL scheme such as precoder cycling according to a specific pre-defined/indicated OL-precoding scheme. In addition, the UE may perform UL transmission by applying the precoder(s) part as instructed for the specific (spatial) dimension for which the U1 and/or U2 information is provided.

As described above, when the specific (spatial) dimension precoder(s) information is deleted and indicated, the payload part may be deleted. In this case, the UE may be defined or configured to perform the BD for different payload sizes in a form in which the overall payload of the corresponding DCI is reduced in comparison with the conventional one.

Mapping of the payload sizes of the U1 and U2 and the corresponding information as above may be defined to correspond to the number of UL (link adaptation) specific RS (for example, SRS) ports of the corresponding UE, which are transmitted in advance (in link with the mapping) or configured/instructed to the UE.

UL MIMO Design Framework

In LTE UL MIMO, the network indicates precoder to UE, then UE transmits the DMRS and data by applying the indicated precoder. In NR UL MIMO, precoded RS based transmission where the same precoder is applied to both the DMRS and the physical data channel is still desirable in terms of DMRS overhead. The reason is that the transmission rank would be smaller than the number of TXRUs due to lack of scatterers in most cases.

Therefore, it is preferable that the precoded RS based transmission where the same precoder is applied to both the DMRS and the physical data channel becomes a baseline in NR UL MIMO.

Regarding transmission technique, it was agreed to support UL DMRS based spatial multiplexing (single user (SU)-MIMO/MU-MIMO). UL coordinated multi-point (CoMP) transmission may also be supported. That is, UL reception point(s) may be transparent to UE.

For UL SU-MIMO, both an open loop (OL) technique where no precoder information is signaled by the network to the UE and a semi-open-loop (OL) technique where a part of precoder information is signaled by the network to the UE may be considered in addition to a conventional closed loop technique where full information (i.e., PMI and RI) of precoder is signaled by the network to the UE. OL and semi-OL MIMO may be useful when full or partial DL/UL reciprocity is valid in TDD. UL MU-MIMO may be based on a closed loop operation, but is not limited thereto.

The UL MIMO transmission techniques may be classified with respect to existence and completeness of the precoder information signaled from the network to the UE as follows:

Closed loop: Full precoder information is signaled to UE
Open loop: No precoder information is not signaled to UE
Semi-open loop: A part of precoder information is signaled to UE Further, it was agreed to support at least 8 orthogonal DL DMRS ports for both DL SU-MIMO and DL MU-MIMO. Similarly to DL, the reference of UL may be LTE so that we propose to support at least 4 orthogonal DMRS ports for both UL SU-MIMO and UL MU-MIMO as the baseline. From SU-MIMO perspective, no clear motivation of supporting higher layers than LTE exists by considering the possibility of a higher rank in practical environments (i.e., limited number of dominant rays at high frequency bands and limited number of TXRUs at the UE). However, when forward compatibility is considered, increasing the maximum layers from the beginning may be considered (e.g. 8 layers for UL SU-MIMO by taking large UE types into account). From MU-MMO perspective, NR has clear motivation of achieving higher order MU-MIMO to achieve target spectral efficiency. However, it would be desirable to support MU multiplexing layers exceeding certain number (e.g. 4 or 8) by utilizing non-orthogonal DMRS ports (e.g. scrambling sequence) in order to manage the DMRS overhead within a reasonable range.

Therefore, it is preferable that a least 4 orthogonal UL DMRS ports are supported for both SU-MIMO and MU-MIMO.

With regard to the number of codewords for spatial multiplexing, supporting up to two codewords as LTE may be reasonable by considering a trade-off relationship between link adaptation flexibility and the control signaling overhead.

Therefore, it is preferable that for NR UL MIMO, up to two codes are basically supported.

Frequency Selective Precoding for UL MIMO

There was an agreement that cyclic prefix (CP)-OFDM without specified low-peak to average power ratio (PAPR)/cubic metric (CM) technique(s) is recommended to be supported for uplink NR waveform for at least up to 40 GHz for enhanced Mobile BroadBand (eMBB) and ultra-reliable low latency communication (URLLC) services.

Considering a CP-OFDM waveform and an increased supportable system bandwidth in NR, frequency selective precoding may be considered to be introduced for UL MIMO. However, the increased control channel overhead due to the indicated subband PMIs may be a critical problem for applying such frequency selective UL-MIMO precoding. Although it may be considered to signal multiple PMIs separately from UL-related DCI and to include a pointer field in the DCI for indicating such signaling, this kind of two-step approach may not be desired due to latency for providing the full information of subband-wise multiple PMIs in a first step. In other words, a motivation of introducing such frequency selective UL precoder is to achieve fast UL link adaptation exploiting the frequency domain as well, so that the full set of precoder information is desired to be delivered instantaneously to the UE when the set of precoder information is scheduled for the UL transmission.

To resolve the control channel overhead issue for frequency-selective UL-MIMO scheduling, applying the dual codebook structure as in DL similarly to the UL case (e.g., 4-Tx case) needs to be investigated. Considering the agreed CP-OFDM structure for UL, a final UL precoder W per subband may be decomposed into a wideband PMI component $W\_1$ and the corresponding subband PMI component $W\_2$. Then, in the UL scheduling DCI, the $W\_1$ information is enough to be included once, and multiple $W\_{25}$ are required to be included depending on the scheduled RB region given by a resource allocation field in the same DCI.

How to define the codebook for W_1 and W_2 is for further study, but the baseline should be reusing Rel-12 DL 4-Tx codebook. The existing LTE 2-Tx DL codebook may be reused as it is for the 2-Tx UL case and the whole per-subband PMIs need to be provided in the UL scheduling grant. It should also be investigated whether the DFT spread OFDM (DFT-S-OFDM) based UL-MIMO precoder is supported and in that case, how to configure the UE with either using the CP-OFDM based UL precoder or using the DFT-S-OFDM based UL precoder as discussed above.

That is, the UE may be configured with at least one of CP-OFDM-based codebook 1 (e.g., the dual codebook structure) and DFS-S-OFDM based codebook 2 (e.g., cubic-metric preserving codebook, etc.) from the base station. In addition, the UE may be configured with on which codebook based UL precoding is to be performed based among the above codebooks from the base station by L1 (e.g., by DCI), L2 (e.g., by MAC CE), and L3 (e.g., by RRC).

Particularly, when the CP-OFDM-based UL transmission is configured/instructed, the UE may be configured/instructed (and/or switched) with one of codebook 1 and codebook 2 from the base station and may apply the configured/instructed codebook and conversely, when the DFS-OFDM based UL transmission is configured/instructed, it may be limited that the UE may continuously apply only codebook 2. The reason is that under the DFS-S-OFDM scheme, the application of codebook 1 may be inappropriate in that the application of codebook 1 greatly amplifies the PAPR and the like.

More particularly, which codebook is applied in conjunction with a specific rank value may be defined or configured to the UE. For example, in the case of transmission of rank X (for example, X=1), codebook 2 may be defined to be applied or may be configured to the UE in terms of transmission power, such as PAPR issues. On the contrary, in the case of rank Y (for example, Y=2) or more, codebook 1 is configured (for example, in general, UE other than a cell-edge region) to be applied to be defined or configured to the UE to apply the precoder capable of maximizing throughput rather than an aspect of the transmission power.

When such operations are applied, when the rank is indicated through the UL grant or the like, the UE may automatically analyze/apply the indicated PMI/precoder while applying the different codebook as above in conjunction with the indicated rank.

In the above description, as an example, an operation is described, in which a specific codebook (for example, codebook 1 or codebook 2, . . . ) is adopted in conjunction with being configured based on a specific waveform (e.g., based on the CP-OFDM or DFS-S-OFDM).

However, the present invention is not limited thereto, and such operations may be defined or configured/instructed to the UE so that the UE may initiate the UL transmission by applying a specific codebook among specific candidate codebook 1 (e.g., a DFT-based codebook), codebook 2 (e.g., a Grassmannian codebook), and codebook 3 (e.g., a householder codebook) under the instruction of the base station regardless of the specific waveform at the time of the UL transmission by the UE.

As a more specific embodiment, candidate codebook 1, which is more suitable when arrangement/spacing between antennas according to a UE antenna configuration are implemented in relatively uniform and/or closely-spaced form, may be defined or configured to the UE in a specific DFT-based codebook (e.g., a dual codebook structure including an LTE-A codebook) using a DFT vector or the like. Further, candidate codebook 2, which is more suitable when the arrangement/spacing between the antennas according to the UE antenna configuration is relatively irregular or widely-spaced, may be defined/configured in a codebook form optimized so as to maximally maintain an intercede vector equal distance, such as the Grassmannian codebook. In addition, candidate codebook 3 may be defined or configured to the UE in a form of a specific hybrid type codebook, for example, the householder codebook as a form made by extracting some code vectors among different codebooks having different attributes and purposes, which include codebook 1 and codebook 2 (according to the UE antenna configuration).

As a result, when the UE accesses a specific base station in advance, the UE may be defined or configured to perform capability signaling, through a UE capability signaling, which codebook which is at least one among (the) specific candidate codebooks which may be applied at the time of the UL transmission is implemented or supported. In addition/or, when the number of codebooks which are implemented/supported as such is two or more, the UE may notify the base station which codebook of the two codebooks the UE prefers (may provide subdivided preference information in such a manner of giving weighting). In this case, which codebook is more suitable may be determined based on the implemented antenna configuration characteristic of the corresponding UE and there is an effect that information related with a codebook showing a more advantageous effect in terms of performance of the codebooks implemented/supported as such is provided to the base station.

In addition, based on the information, the base station allows the UE to configure/indicate the codebook to be applied at the time of the UL transmission. In this case, among the codebooks which the UE performs the capability signaling to implement/support, a codebook which is not implemented/supported by the corresponding base station may also exist. In this case, the base station may configure the UE to use only the codebook implemented/supported thereby (regardless of the codebook-to-codebook preference information reported by the UE). Alternatively, even if the base station is also capable of configuring/instructing a plurality of codebooks to the UE (that is, even if all of the codebooks are implemented), the base station may configure/indicate the specific codebook to commonly applied to be cell-specific or UE group-specific by synthetically considering a codebook implementation/support status and/or codebook preference status of the plurality of UEs accessing the corresponding cell (for example, for the purpose of facilitating UL MU-MIMO transmission or the like).

In the method in which the base station configures/instructs the corresponding UE to apply the specific codebook at the time of the UL transmission, a relatively quasi-static configuration method by RRC signaling (and/or MAC CE signaling) or the like is also applicable. As described above, it is possible to dynamically indicate which specific codebook is to be applied to the UE by a relatively more dynamic signaling/indication in conjunction with a specific UL scheduling grant. Such a dynamic indication may be implicitly and/or explicitly indicated (in conjunction with feature field information) via a specific field in the control signaling, such as the corresponding UL grant.

More particularly, as mentioned above, which codebook is to be applied in conjunction with a specific rank may be pre-defined or configured to the UE. For example, when an UL grant scheduling rank 1 UL transmission is transmitted, the UE may be continuously defined or configured to the UE to initiate the UL transmission by applying a specific codebook (e.g., codebook 2) associated therewith. Further, when an UL grant scheduling rank X (for example, x>1) UL transmission is transmitted, the UE may be continuously defined or configured to the UE to initiate the UL transmission by applying a specific codebook (e.g., codebook 1) associated therewith.

Thus, if supported, all subband UL-MIMO precoder(s) is(are) preferably instantaneously provided to the UE within the UL scheduling grant and in this case, a wideband component may be included only once to reduce control channel overhead.

Precoded SRS Based Transmission for UL MIMO

For UL link adaptation (LA), LTE may configure the UE to transmit SRS with different multiple sets of SRS related parameters, where the UE may apply implemented specific precoding/selection on SRS port(s) especially when the configured number of SRS port(s) is smaller than the UE's total transmit (Tx) antenna ports. Compared to Rel-13/14 enhanced (e)FD-MIMO beamformed CSI-RS based operations, precoded/beamformed SRS transmissions for UL LA need to be thoroughly investigated in NR. For convenience of description, there may be three UE types in terms of the UL LA process as follows:

1) Type 1 UE (UL-LA Initiated with Transmitting Precoded SRS(s))

The UE may be configured with one or more SRS resources and beamforming indicated by transmit and reception point (TRP) or TRP transparent beamforming is applied to the SRS transmission on each SRS resource.

Based on measuring UE's transmitted precoded SRS resource(s), the TRP determines SRS resource indicator (SRI) (in case of multiple configured SRS resources), MCS and/or a precoder across the SRS port in the SRI are determined and indicates the SRI, the MCS, and the precoder to the UE when the UL scheduling grant is delivered to the UE.

2) Type 2 UE (UL-LA Initiated with Transmitting Non-Precoded SRS(s))

The UE may be configured with one SRS resource and the UE transmits non-precoded SRS.

Based on measuring UE's transmitted non-precoded SRS resource(s), the TRP determines the MCS and/or the precoder across the SRS port in the SRI are determined and indicates the MCS and the precoder to the UE when the UL scheduling grant is delivered to the UE.

In the case of 4-Tx UE and CP-OFDM, the above dual codebook structure is used for the frequency-selective UL-MIMO precoder.

3) Type 3 UE (UL-LA Initiated with Transmitting Non-Precoded SRS(s) and Transmission of Precoded SRS According to TRP's Indication)

Based on measuring UE's non-precoded SRS $K_1$ port(s), the TRP determines coarse beamformer and indicates it to the UE to be applied on transmitting the following precoded SRS $K_2(\leq K_1)$ ports(s). Then, based on measuring UE's transmitted precoded SRS port(s), the TRP determines MCS and/or precoder, and indicates them when UL scheduling grant is delivered to the UE.

Based on the above classified types that may be reported by the UE, different UL-LA processes may be configured to be UE-specific, including which types of SRS transmission is performed by the UE. Regarding precoded SRS transmission cases (e.g., Type 1 and/or Type 3), multiple SRS resources may be configured to UE, where the UE transmits differently-beamformed SRS port(s) on each configured SRS resource. The TRP may indicate such beamformer information to the UE, or the UE is allowed to apply the TRP-transparent beamformer for the SRS transmission. Then, when UL scheduling grant is given to the UE, the TRP may indicate the SRS resource indicator for which the UE should apply the same beamformer used on the SRS transmission corresponding to the indicated SRS resource, for the scheduled UL transmission. Further, on the selected SRS resource, the TRP may further indicate digital precoding information (e.g., UL PMI) over the SRS port(s) within the indicated SRS resource. It should be noted that the configured number of SRS ports for each SRS resource may be interpreted as a target rank in UE's UL transmission. Therefore, the TRP may configure multiple SRS resources, each corresponding to the different rank to cover rank 1 to 4 (e.g., v-port SRS configured for v-th SRS resource (where v=1, 2, 3,)).

Accordingly, procedures related with the non-precoded and/or precoded SRS transmission should be further investigated based on different UE types in terms of the UL link adaptation process.

Figure 13:
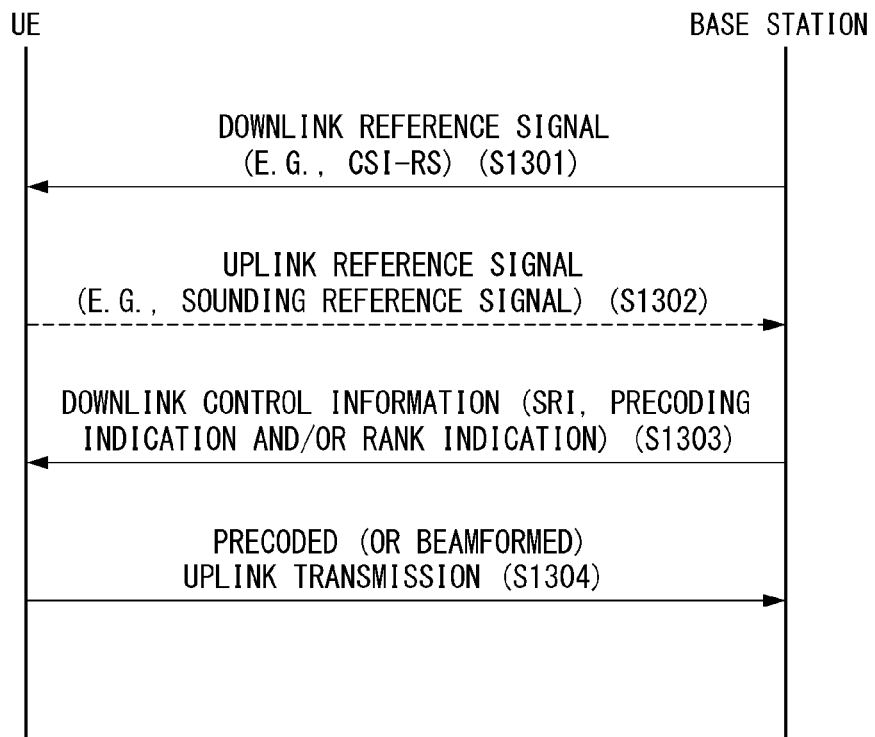
FIG. 13 is a diagram illustrating a method for transmitting and receiving an uplink according to an embodiment of the present invention.

FIG. 13 is a diagram illustrating a method for transmitting and receiving an uplink according to an embodiment of the present invention.

In FIG. 13, the operation of the present invention is simply illustrated, and a more detailed description thereof may follow the aforementioned operation.

Referring to FIG. 13, the UE receives downlink control information (DCI) from the base station (S1303).

The DCI may include an SRS Resource Indication (SRI), a precoding indication (e.g., U1 and/or U2, or TPMI) and/or a rank indication (e.g., TRI).

For example, the precoding indication may be divided into a first precoding indication (i.e., U1) having a wideband attribute and a second precoding indication (U2) indicated for each subband. In this case, the second precoding indication U2 may be transmitted while being jointly encoded with uplink resource allocation information scheduled to the UE. That is, the second precoding indication U2 may be configured/indicated together in link with a UL RA field.

The UE transmits an uplink to the base station by applying precoding indicated by the precoding indication on an antenna port of an SRS transmitted in an SRS resource selected by the SRI (S1304).

The number of ranks for the uplink transmission may be explicitly indicated by the DCI or implicitly determined as the number of antenna ports of the SRS transmitted in the SRS resource selected by the SRI in the DCI.

Meanwhile, before step S1303, the UE may receive a downlink reference signal (DL RS) (e.g., CSI-RS, etc.) from the base station (S1301).

Further, the UE may transmit the precoded SRS for each of one or more SRS resources configured for the UE to the base station (S1302).

In this case, the base station may select an SRS resource having the highest reception quality through SRS measurement for each SRS resource and indicate the UE by deriving the precoding indication (for example, U1 and/or U2, or TPMI) with respect to the SRS port(s) in the selected SRS resource.

Further, a beamforming vector and/or beamforming coefficient applied for transmission of the precoded SRS may be configured by the base station through a control channel signaling or arbitrarily determined by the UE.

Further, the beamforming vector and/or beamforming coefficient applied for the precoded SRS transmission in the SRS resource may be determined based on a beamforming vector and/or beamforming coefficient used for reception of the DL RS (e.g., CSI-RS etc.).

More specifically, the UE measures the DL RS transmitted by the base station to find (and also report) a best "serving-beam". In addition, the UE may determine a paired best "Rx-receiving-beam" thereof for the best "serving-beam". Further, the UE may transmit the precoded SRS by applying the corresponding beamforming vector/coefficient (s), when transmitting the precoded/beamformed SRS, by reversing (e.g., taking Hermitian) the best "Rx-receiving-beam" by using a DL/UL channel reciprocity characteristic (or a beam pair link). That is, the precoded SRS transmission may be performed with spatial filtering which is the same as spatial filtering used for the reception of a specific DL RS (e.g., the best "serving-beam").

When the DL-RS is the CSI-RS, the CSI-RS resource used for determining the beamforming vector and/or beamforming coefficient applied for the precoded SRS transmission is indicated by the base station.

In addition, the precoding SRS transmission which the UE performs in the SRS resource may be performed independently for each subband.

For example, for the precoded SRS transmission in the SRS resource, an independent beamforming vector and/or beamforming coefficient may be applied for each subband.

Further, the beamforming vector and/or beamforming coefficient applied for the SRS transmission precoded for each subband in the SRS resource may be determined based on a beamforming vector and/or beamforming coefficient used for reception of the DL RS (e.g., CSI-RS etc.).

More specifically, the UE measures the DL RS transmitted by the base station to find (and also report) the best "serving-beam". In addition, the UE may determine a paired best "Rx-receiving-beam" thereof for the best "serving-beam". Further, the UE may transmit the precoded SRS for each subband by applying the corresponding beamforming vector/coefficient(s), when transmitting the precoded/beamformed SRS, by reversing (e.g., taking Hermitian) the best "Rx-receiving-beam" by using a DL/UL channel reciprocity characteristic (or a beam pair link). That is, the precoded SRS transmission may be performed with spatial filtering which is the same as spatial filtering used for the reception of a specific DL RS (e.g., the best "serving-beam") in a specific subband.

In this case, when the DL-RS is the CSI-RS, the CSI-RS resource used for determining the beamforming vector and/or beamforming coefficient applied for the precoded SRS transmission is indicated by the base station.

General Apparatus to which the Present Invention May be Applied

Figure 14:
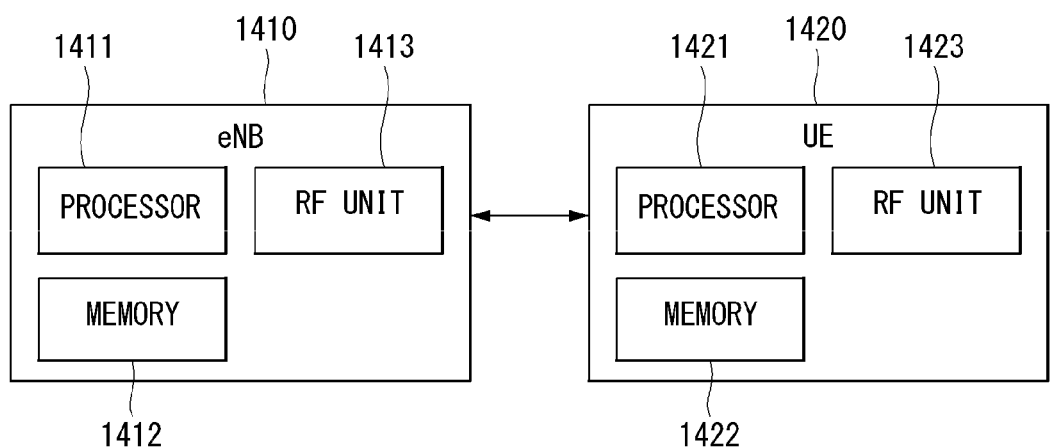
FIG. 14 illustrates a block diagram of a wireless communication apparatus according to an embodiment of the present invention.

FIG. 14 illustrates a block diagram of a wireless communication apparatus according to an embodiment of the present invention.

Referring to FIG. 14, the wireless communication system includes a base station (eNB) 1410 and a plurality of user equipments (UEs) 1420 located within the region of the eNB 1410.

The eNB 1410 includes a processor 1411, a memory 1412 and a radio frequency unit 1413. The processor 1411 implements the functions, processes and/or methods proposed in FIGS. 1 to 13 above. The layers of wireless interface protocol may be implemented by the processor 1411. The memory 1412 is connected to the processor 1411, and stores various types of information for driving the processor 1411. The RF unit 1413 is connected to the processor 1411, and transmits and/or receives radio signals.

The UE 1420 includes a processor 1421, a memory 1422 and a radio frequency unit 1423. The processor 1421 implements the functions, processes and/or methods proposed in FIGS. 1 to 13 above. The layers of wireless interface protocol may be implemented by the processor 1421. The memory 1422 is connected to the processor 1421, and stores various types of information for driving the processor 1421. The RF unit 1423 is connected to the processor 1421, and transmits and/or receives radio signals.

The memories 1412 and 1422 may be located interior or exterior of the processors 1411 and 1421, and may be connected to the processors 1411 and 1421 with well known means. In addition, the eNB 1410 and/or the UE 1420 may have a single antenna or multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations may be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

The present invention has been described based on an example in which it is applied to the 3GPP LTE/LTE-A systems or 5G system, but may be applied to various wireless communication systems in addition to the 3GPP LTE/LTE-A systems or 5G system.

The invention claimed is:

1. A method of performing uplink transmission by a user equipment (UE) in a wireless communication system, the method comprising:
performing a plurality of precoded sounding reference signal (SRS) transmissions, to a base station, on a plurality of SRS resources configured for the UE;
receiving, from the base station, a transmission grant for the UE to perform the uplink transmission, wherein the transmission grant includes an SRS resource indication (SRI) which indicates at least one SRS resource among the plurality of SRS resources on which the plurality of precoded SRS transmissions were performed by the UE;
determining a precoding for the uplink transmission based on the at least one SRS resource indicated by the SRI in the transmission grant; and
performing the uplink transmission to the base station by applying the precoding that was determined based on the at least one SRS resource indicated by the SRI in the transmission grant.

2. The method of claim 1, wherein at least one of an uplink beamforming vector or an uplink beamforming coefficient applied for performing the plurality of precoded SRS transmissions is configured through control channel signaling by the base station or is determined by the UE.

3. The method of claim 2, wherein the at least one of the uplink beamforming vector or the uplink beamforming coefficient applied for performing the plurality of precoded SRS transmissions on the plurality of SRS resources is determined based on at least one of a downlink beamforming vector or a downlink beamforming coefficient used for reception of a downlink reference signal (DL RS).

4. The method of claim 3, wherein the DL RS is a channel state information reference signal (CSI-RS), and
wherein a CSI-RS resource used for determining the at least one of the uplink beamforming vector or the uplink beamforming coefficient applied for the plurality of precoded SRS transmissions is indicated by the base station.

5. The method of claim 1, wherein at least one of an uplink beamforming vector or an uplink beamforming coefficient is independently applied for each subband for the plurality of precoded SRS transmissions on the plurality of SRS resources.

6. The method of claim 5, wherein the at least one of the uplink beamforming vector or the uplink beamforming coefficient applied for the plurality of precoded SRS transmissions for each subband is determined based on at least one of a downlink beamforming vector or a downlink beamforming coefficient used for reception of a downlink reference signal (DL RS).

7. The method of claim 6, wherein the DL RS is a channel state information reference signal (CSI-RS), and
a CSI-RS resource used for determining the at least one of the uplink beamforming vector or the uplink beamforming coefficient applied for the plurality of precoded SRS transmissions is indicated by the base station.

8. The method of claim 1, wherein a number of ranks for the uplink transmission is determined as a number of antenna ports of at least one precoded SRS transmission that was performed in the at least one SRS resource indicated by the SRI.

9. The method of claim 1, further comprising:
receiving, from the base station, a precoding indication, wherein the precoding indication is divided into first precoding indication and second precoding indication, and
wherein the second precoding indication is jointly encoded with uplink resource allocation information scheduled to the UE.

10. The method of claim 1, wherein determining the precoding for the uplink transmission based on the at least one SRS resource that is indicated by the SRI comprises:
based on the SRI indicating a first SRS resource: determining the precoding as comprising a first precoding that was used to perform a first precoded SRS transmission on the first SRS resource; and
based on the SRI indicating a second SRS resource: determining the precoding as comprising a second precoding that was used to perform a second precoded SRS transmission on the second SRS resource.

11. The method of claim 1, wherein determining the precoding for the uplink transmission comprises: determining a plurality of precoding coefficients for the uplink transmission, and
wherein performing the uplink transmission to the base station by applying the precoding comprises: performing the uplink transmission to the base station by applying the plurality of precoding coefficients to antenna ports that are identical to antenna ports of at least one precoded SRS transmission that was performed on the at least one SRS resource indicated by the SRI.

12. The method of claim 1, wherein the transmission grant is received from the base station through Downlink Control Information (DCI).

13. The method of claim 1, wherein the transmission grant is received from the base station through Radio Resource Control (RRC) signaling.

14. A user equipment (UE) configured to perform uplink transmission in a wireless communication system, the user equipment comprising:
a radio frequency (RF) unit;
at least one processor; and
at least one computer memory operably connectable to the at least one processor and storing instructions that, when executed by the at least one processor, perform operations comprising:
performing a plurality of precoded sounding reference signal (SRS) transmissions, to a base station through the RF unit, on a plurality of SRS resources configured for the UE;
receiving, from the base station through the RF unit, a transmission grant for the UE to perform the uplink transmission, wherein the transmission grant includes an SRS resource indication (SRI) which indicates at least one SRS resource among the plurality of SRS resources on which the plurality of precoded SRS transmissions were performed by the UE;
determining a precoding for the uplink transmission based on the at least one SRS resource indicated by the SRI in the transmission grant; and
performing the uplink transmission, through the RF unit to the base station, by applying the precoding that was determined based on the at least one SRS resource indicated by the SRI in the transmission grant.

15. The UE of claim 14, wherein at least one of an uplink beamforming vector or an uplink beamforming coefficient applied for performing the plurality of precoded SRS transmissions is configured through control channel signaling by the base station or is determined by the UE.

16. The UE of claim 15, wherein the at least one of the uplink beamforming vector or the uplink beamforming coefficient applied for performing the plurality of precoded SRS transmissions on the plurality of SRS resource is determined based on at least one of a downlink beamforming vector or a downlink beamforming coefficient used for reception of a downlink reference signal (DL RS).

17. The UE of claim 16, wherein the DL RS is a channel state information reference signal (CSI-RS), and
wherein a CSI-RS resource used for determining the at least one of the uplink beamforming vector or the uplink beamforming coefficient applied for the plurality of precoded SRS transmissions is indicated by the base station.

18. The UE of claim 14, wherein at least one of an uplink beamforming vector or an uplink beamforming coefficient is independently applied for each subband for the plurality of precoded SRS transmissions on the plurality of SRS resources.

19. The UE of claim 18, wherein the at least one of the uplink beamforming vector or the uplink beamforming coefficient applied for the plurality of precoded SRS transmissions for each subband is determined based on at least one of a downlink beamforming vector or a downlink beamforming coefficient used for reception of a downlink reference signal (DL RS).

20. The UE of claim 14, wherein determining the precoding for the uplink transmission based on the at least one SRS resource that is indicated by the SRI comprises:
based on the SRI indicating a first SRS resource: determining the precoding as comprising a first precoding that was used to perform a first precoded SRS transmission on the first SRS resource; and
based on the SRI indicating a second SRS resource: determining the precoding as comprising a second precoding that was used to perform a second precoded SRS transmission on the second SRS resource.

* * * * *